US009562987B2

United States Patent
Guner et al.

(10) Patent No.: US 9,562,987 B2
(45) Date of Patent: Feb. 7, 2017

(54) MULTICOMPONENT BOREHOLE RADAR SYSTEMS AND METHODS

(75) Inventors: Baris Guner, Houston, TX (US);
Burkay Donderici, Houston, TX (US);
Michael S. Bittar, Houston, TX (US);
Luis E. San Martin, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 629 days.

(21) Appl. No.: 14/111,963

(22) PCT Filed: Apr. 18, 2011

(86) PCT No.: PCT/US2011/032865
§ 371 (c)(1),
(2), (4) Date: Oct. 15, 2013

(87) PCT Pub. No.: WO2012/144977
PCT Pub. Date: Oct. 26, 2012

(65) Prior Publication Data
US 2014/0032116 A1 Jan. 30, 2014

(51) Int. Cl.
*G01V 3/30* (2006.01)
*G01V 3/28* (2006.01)

(52) U.S. Cl.
CPC .. *G01V 3/30* (2013.01); *G01V 3/28* (2013.01)

(58) Field of Classification Search
CPC .............. G01V 3/30; G01D 5/24; G01F 1/28; G01L 9/0016; G01L 9/0019; G01L 9/0073
USPC .......................... 702/6, 7; 324/333, 334, 338
See application file for complete search history.

(56) References Cited

U.S. PATENT DOCUMENTS

| 3,406,766 A | 10/1968 | Henderson |
| 4,072,200 A | 2/1978 | Morris et al. |
| 4,224,989 A | 9/1980 | Blount |
| 4,297,699 A | 10/1981 | Fowler et al. |

(Continued)

FOREIGN PATENT DOCUMENTS

| FR | 2561395 | 9/1985 |
| GB | 1111629 | 5/1968 |

(Continued)

OTHER PUBLICATIONS

Daniels, David J., "Surface-Penetrating Radar", Electronics & Communication Engineering Journal, Aug. 1996, pp. 165-182.

(Continued)

*Primary Examiner* — John H Le
(74) *Attorney, Agent, or Firm* — Iselin Law PLLC; Benjamin Fite

(57) ABSTRACT

Disclosed herein are multicomponent borehole radar tools and methods. At least some tool embodiments employ at least two antennas that receive reflections of electromagnetic pulses transmitted from the tool. A processor processes the receive signals to identify reflection signals and to determine a direction and/or distance to the sources of the reflection signals. Possible sources include formation boundaries, fluid boundaries, cased wells, and other features that cause contrasts in electromagnetic properties. In addition to reflection signals, the measured responses may include direct signal measurements that are useful for determining formation resistivity and permittivity. Each of the antennas may transmit and receive, and they may be collocated to reduce tool size and reduce processing complexity. Disclosed logging tool examples employ both electric and magnetic dipole antennas.

20 Claims, 14 Drawing Sheets

(56) References Cited

U.S. PATENT DOCUMENTS

| | | | |
|---|---|---|---|
| 4,430,653 A | 2/1984 | Coon et al. |
| 4,443,762 A | 4/1984 | Kuckes |
| 4,458,767 A | 7/1984 | Hoehn, Jr. |
| 4,504,833 A | 3/1985 | Fowler et al. |
| 4,593,770 A | 6/1986 | Hoehn, Jr. |
| 4,670,717 A | 6/1987 | Sender |
| 4,689,569 A | 8/1987 | Duff |
| 4,791,373 A | 12/1988 | Kuckes |
| 4,814,768 A | 3/1989 | Chang |
| 5,115,198 A | 5/1992 | Gianzero et al. |
| 5,343,152 A | 8/1994 | Kuckes |
| 5,358,050 A | 10/1994 | Schmidt |
| 5,389,881 A | 2/1995 | Bittar et al. |
| 5,530,359 A | 6/1996 | Habashy et al. |
| 5,631,562 A | 5/1997 | Cram et al. |
| 5,676,212 A | 10/1997 | Kuckes |
| 5,720,354 A | 2/1998 | Stump et al. |
| 5,720,355 A | 2/1998 | Lamine et al. |
| 6,078,867 A | 6/2000 | Plumb et al. |
| 6,163,155 A | 12/2000 | Bittar |
| 6,191,586 B1 | 2/2001 | Bittar |
| 6,218,842 B1 | 4/2001 | Bittar |
| 6,353,321 B1 | 3/2002 | Bittar |
| 6,359,438 B1 | 3/2002 | Bittar |
| 6,491,115 B2 | 12/2002 | Van Houwelingen et al. |
| 6,538,447 B2 | 3/2003 | Bittar |
| 6,672,409 B1 | 1/2004 | Dock et al. |
| 6,712,140 B2 | 3/2004 | Van Oers et al. |
| 6,755,263 B2 | 6/2004 | Alft et al. |
| 6,778,127 B2 | 8/2004 | Stolarczyk et al. |
| 6,810,331 B2 | 10/2004 | Bittar et al. |
| 6,885,943 B2 | 4/2005 | Bittar et al. |
| 6,911,824 B2 | 6/2005 | Bittar |
| 6,944,546 B2 | 9/2005 | Xiao et al. |
| 6,958,610 B2 | 10/2005 | Gianzero |
| 6,985,814 B2 | 1/2006 | McElhinney |
| 7,013,991 B2 | 3/2006 | Wilson-Langman et al. |
| 7,019,528 B2 | 3/2006 | Bittar |
| 7,038,455 B2 | 5/2006 | Beste et al. |
| 7,046,009 B2 | 5/2006 | Itskovich |
| 7,046,010 B2 | 5/2006 | Hu et al. |
| 7,062,072 B2 | 6/2006 | Anxionnaz et al. |
| 7,098,664 B2 | 8/2006 | Bittar et al. |
| 7,098,858 B2 | 8/2006 | Bittar et al. |
| 7,123,016 B2 | 10/2006 | Larsen |
| 7,138,803 B2 | 11/2006 | Bittar |
| 7,143,844 B2 | 12/2006 | Alft et al. |
| 7,227,363 B2 | 6/2007 | Gianzero et al. |
| 7,265,552 B2 | 9/2007 | Bittar |
| 7,345,487 B2 | 3/2008 | Bittar et al. |
| 7,350,568 B2 | 4/2008 | Mandal et al. |
| 7,427,863 B2 | 9/2008 | Bittar |
| 7,557,579 B2 | 7/2009 | Bittar |
| 7,557,580 B2 | 7/2009 | Bittar |
| 7,609,065 B2 | 10/2009 | Banning et al. |
| 7,659,722 B2 | 2/2010 | Bittar |
| 7,746,078 B2 | 6/2010 | Bittar et al. |
| 7,825,664 B2 | 11/2010 | Homan et al. |
| 7,839,148 B2 | 11/2010 | Vehra et al. |
| 7,839,346 B2 | 11/2010 | Bittar et al. |
| 7,982,464 B2 | 7/2011 | Bittar et al. |
| 8,004,282 B2 | 8/2011 | Itskovich |
| 8,016,053 B2 | 9/2011 | Menezes et al. |
| 8,030,937 B2 | 10/2011 | Hu et al. |
| 8,085,049 B2 | 12/2011 | Bittar et al. |
| 8,096,355 B2 | 1/2012 | McDaniel et al. |
| 8,174,265 B2 | 5/2012 | Bittar et al. |
| 8,222,902 B2 | 7/2012 | Bittar et al. |
| 8,264,228 B2 | 9/2012 | Bittar et al. |
| 8,274,289 B2 | 9/2012 | Bittar et al. |
| 8,347,985 B2 | 1/2013 | Bittar et al. |
| 8,378,908 B2 | 2/2013 | Wisler et al. |
| 8,917,094 B2 | 12/2014 | Bittar et al. |
| 9,310,508 B2 | 4/2016 | Donderici et al. |
| 2007/0235225 A1 | 10/2007 | Bittar |
| 2008/0224707 A1 | 9/2008 | Wiser |
| 2009/0138202 A1 | 5/2009 | Tang et al. |
| 2009/0229826 A1 | 9/2009 | East, Jr. et al. |
| 2009/0310441 A1 | 12/2009 | Johnson et al. |
| 2010/0012377 A1 | 1/2010 | Sharp et al. |
| 2011/0175899 A1 | 7/2011 | Bittar et al. |
| 2011/0186290 A1 | 8/2011 | Roddy et al. |
| 2011/0187566 A1 | 8/2011 | Soenen et al. |
| 2011/0192592 A1 | 8/2011 | Roddy et al. |
| 2011/0199228 A1 | 8/2011 | Roddy et al. |
| 2011/0221443 A1 | 9/2011 | Bittar et al. |
| 2011/0298461 A1 | 12/2011 | Bittar et al. |
| 2011/0308859 A1 | 12/2011 | Bittar et al. |
| 2012/0024600 A1 | 2/2012 | Bittar et al. |
| 2012/0133367 A1 | 5/2012 | Bittar et al. |
| 2012/0283951 A1 | 11/2012 | Li et al. |

FOREIGN PATENT DOCUMENTS

| | | |
|---|---|---|
| GB | 1363079 | 8/1974 |
| GB | 2030414 | 4/1980 |
| GB | 2411729 | 9/2005 |
| GB | 2475456 | 11/2012 |
| JP | 8094737 | 4/1996 |
| WO | WO-01/48353 | 7/2001 |
| WO | WO-03/080988 | 10/2003 |
| WO | WO-2006/079154 | 8/2006 |
| WO | WO-2008/154679 | 12/2008 |
| WO | 2010/005902 | 1/2010 |
| WO | 2010/005907 | 1/2010 |
| WO | 2010/060040 | 5/2010 |
| WO | 2012/005737 | 1/2012 |
| WO | 2012/064342 | 5/2012 |
| WO | 2012/121697 | 9/2012 |
| WO | WO-2012/144977 | 10/2012 |

OTHER PUBLICATIONS

Liu, Sixin et al., "Electromagnetic Logging Technique Based on Borehole Radar", IEEE Transactions on Geoscience and Remote Sensing, vol. 40, No. 9, Sep. 2002, pp. 2083-2092.

Liu, Sixin et al., "Application of Borehole Radar for Subsurface Physical Measurement", Nanjing Institute of Geophysical Prospecting and Institute of Physics Publishing, J. Geophys. Eng. 1 (2004), pp. 221-227.

Van Dongen, Koen W., et al., "A Directional Borehole Radar System", Subsurface Sensing Technologies and Applications, vol. 3, No. 4, Oct. 2002, Delft University of Technology, Delft, The Netherlands, pp. 327-346.

Callaghan, G. "HFSS Modeling of Cross-Coupling in Borehole Radar", The Institution of Electrical Engineers, printed and published by IEEE, 2002, pp. 217-221, Savoy Place, London WC2R 0BL, UK.

PCT International Search Report and Written Opinion, dated Jul. 26, 2011, Appl No. PCT/US2011/032865, "Multicomponent Borehole Radar Systems and Methods", filed Apr. 18, 2011, 8 pgs.

PCT International Preliminary Report on Patentability, dated Jun. 10, 2013, Appl No. PCT/US2011/032865, "Multicomponent Borehole Radar Systems and Methods", filed Apr. 18, 2011, 17 pgs.

PCT International Search Report and Written Opinion, dated Jan. 19, 2010, Appl No. PCT/US2009/065537, "A 3D Borehole Imager", filed Nov. 23, 2009, 7 pgs.

PCT International Search Report and Written Opinion, dated Aug. 27, 2010, Appl No. PCT/US10/40447, "Method and Apparatus for Sensing Elongated Subterranean Anomalies", filed Jun. 29, 2010, 9 pgs.

PCT International Preliminary Report on Patentability, dated Jun. 3, 2011, Appl No. PCT/US2009/065537, "A 3D Borehole Imager", filed Nov. 23, 2009, 6 pgs.

US Non-Final Office Action, dated Mar. 13, 2013, U.S. Appl No. 13/061,759, "A 3D Borehole Imager", filed Nov. 23, 2009, 17 pgs.

US Non-Final Office Action, dated Sep. 24, 2013, U.S. Appl. No. 13/061,759, "A 3D Borehole Imager", filed Nov. 23, 2009, 12 pgs.

US Non Final Office Action, Dated Apr. 3, 2015, U.S. Appl No. 13/061,759, "A 3D Borehole Imager," Filed Nov. 23, 2009, 25 Pgs.

(56) References Cited

OTHER PUBLICATIONS

Au Patent Examination Report No. 3, Dated Apr. 20, 2015, Appl No. 2011366229, "Multicomponent Borehole Radar Systems and Methods," Filed Apr. 18, 2011, 3 pgs.
Canada Office Action, Dated Feb. 23, 2015, Appl No. 2,831,277, "Multicomponent Borehole Radar Systems and Methods," Filed Apr. 18, 2011, 4 pgs.
Extended European Search Report, Dated Aug. 20, 2015 Multicomponent Borehole Radar Systems and Methods Appln No. 11863883.2 filed Apr. 18, 2011, 6 pgs.
Indonesia Office Action, Dated Jul. 15, 2015 Multicomponent Borehole Radar Systems and Methods Appln No. W00201304616 filed Apr. 18, 2011, 3 pgs.
Russian Office Action, Dated Oct. 9, 2015 Multicomponent Borehole Radar Systems and Methods filed Apr. 8, 2011 Appln. No. 2013143739, 6 pgs.
Zhdanov, Michael et al., "Foundation of Tensor Induction Well-Logging", Zhdanov, Michael et al., Foundations of Tensor Induction Well-Logging, Petrophysics, vol. 42, No. 6 (Nov.-Dec. 2001); p. 588-610, 23 pgs.
GCC Examination Report, Dated Dec. 15, 2015 Multicomponent Borehole Radar Systems and Methods Appln. No. 20970 filed Apr. 4, 2012, 6 pgs.

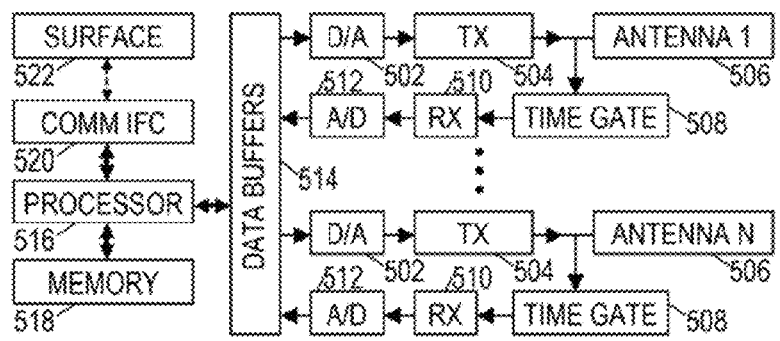
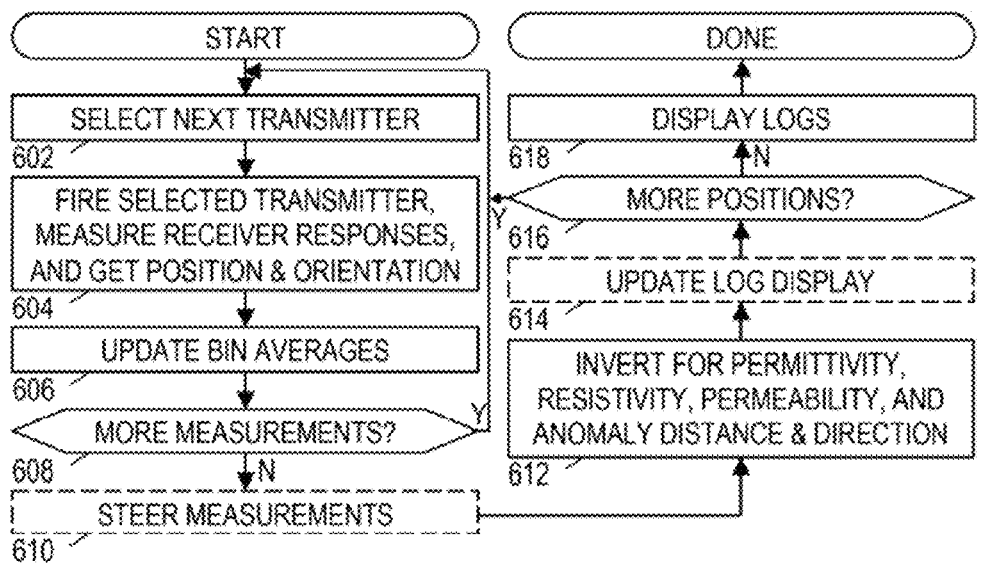
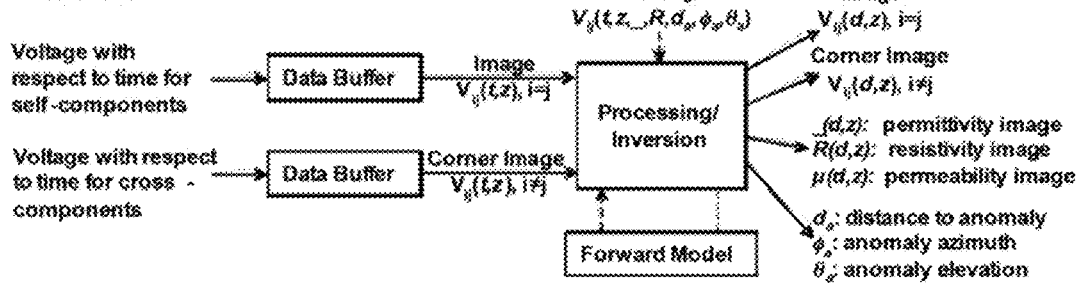

MULTICOMPONENT BOREHOLE RADAR SYSTEMS AND METHODS

BACKGROUND

In the field of petroleum well drilling and logging, electromagnetic logging tools are frequently used to provide an indication of the electrical resistivity of rock formations surrounding an earth borehole. Such information regarding resistivity is useful in ascertaining the presence or absence of hydrocarbons. A typical electromagnetic logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation.

The frequency-domain based operation of these tools imposes certain limitations when such tools are adapted for use in geosteering, where long detection ranges and accurate images are desired. To a limited extent, these features can be provided with wide antenna spacings, multiple measurement frequencies, and complex inversion algorithms.

There have been proposed a number of tools with time-domain based operations, including U.S. Pat. No. 4,297,699, "Radar drill guidance system" by Fowler; U.S. Pat. No. 5,115,198, "Pulsed electromagnetic dipmeter method and apparatus employing coils with finite spacing" by Gianzero; U.S. Pat. No. 6,712,140, "Borehole radar antenna and algorithm, method and apparatus for subsurface surveys" by Van Oers; U.S. Pat. No. 6,778,127, "Drillstring radar" by Stolarczyk; U.S. Pat. No. 7,123,016, "Systems and methods useful for detecting presence and/or location of materials" by Larsen; and U.S. Pat. No. 7,046,009, "Method for measuring transient electromagnetic components to perform deep geosteering while drilling" by Itskovich. It does not appear that any of these proposed tools have proven commercially feasible. The authors believe that this outcome is at least partly the result of costly electronics which prove too fragile for the extreme conditions found in the drilling environment, and partly due to the use of antenna configurations that complicate the inversion and interpretation process.

BRIEF DESCRIPTION OF THE DRAWINGS

A better understanding of the various disclosed embodiments can be obtained when the following detailed description is considered in conjunction with the attached drawings, in which:

FIG. 5 is a block diagram of an illustrative electronics module for an electromagnetic logging tool;

FIG. 6 is a flow diagram of an illustrative electromagnetic logging method;

FIG. 7 is a data flow diagram of an illustrative inversion operation;

Figures 1, 2, 3, 4:
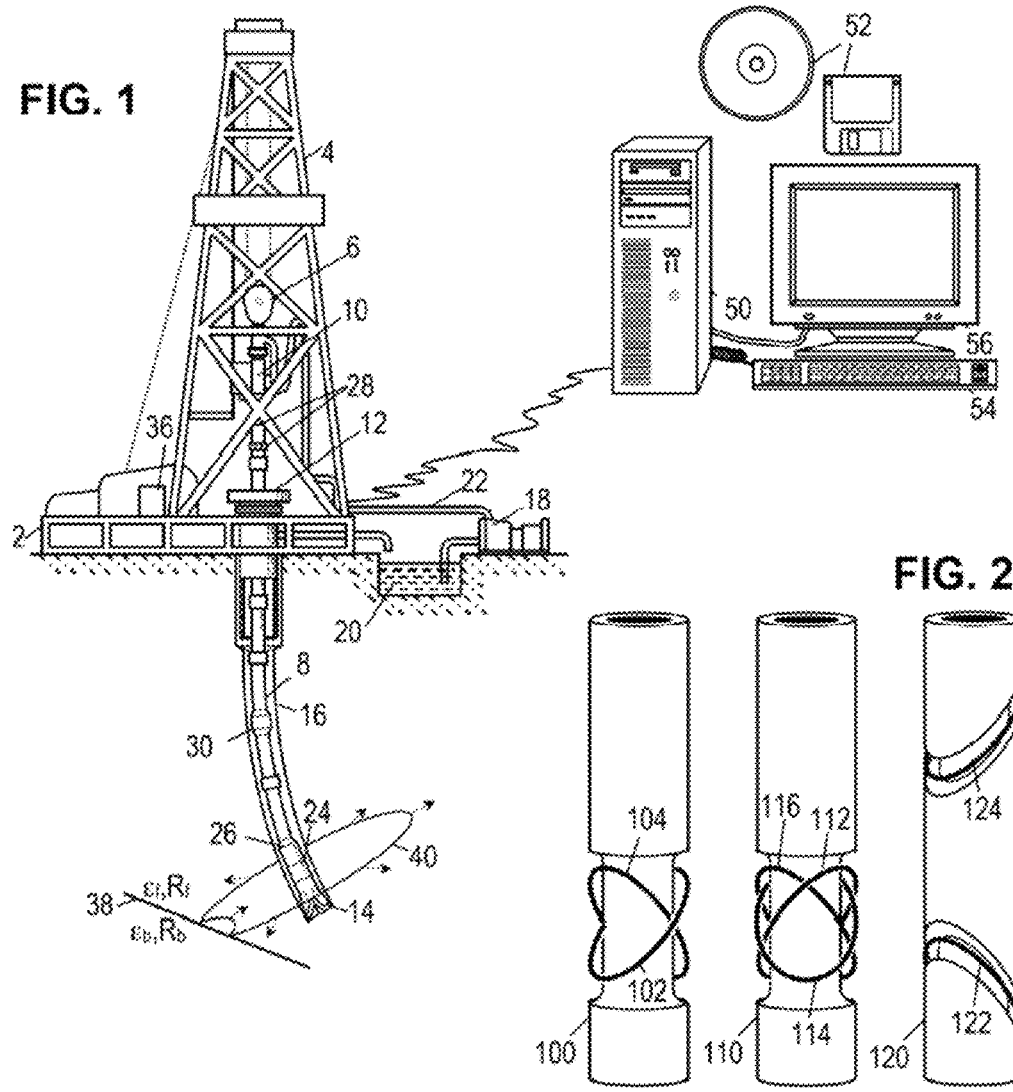
FIG. 1 shows an illustrative logging while drilling environment including a dipping formation boundary.
FIG. 2 shows illustrative electromagnetic logging tool antenna configurations.
FIG. 3 shows angles for defining the orientation of a tilted antenna.
FIG. 4 shows the division of a borehole circumference into azimuthal bins.

By way of example, specific system and method embodiments are shown in the drawings and are described in detail below. It should be understood, however, that the drawings and detailed description are not intended to limit the disclosure, but on the contrary, the intention is to cover all modifications, equivalents and alternatives falling within the scope of the appended claims.

DETAILED DESCRIPTION

Accordingly, there is disclosed herein a borehole tool that employs multicomponent radar to detect formation anomalies (such as bed boundaries or other well bores), along with systems, methods, and applications for such tools. Some tool embodiments include at least two antennas that receive reflections of electromagnetic pulses transmitted from the tool. A processor processes the receive signals to identify reflection signals and to determine a direction and/or distance to the sources of the reflection signals. Possible sources include formation boundaries, fluid boundaries, cased wells, and other features that cause contrasts in electromagnetic properties. Each of the antennas may transmit and receive, and they may be collocated to reduce tool size and reduce processing complexity. Disclosed logging tool examples employ both electric and magnetic dipole antennas.

At least some method embodiments include: transmitting electromagnetic pulses from a tool in a borehole; measuring self-component and cross-component responses to the electromagnetic pulses; and determining a distance and/or direction for one or more sources of reflection signals. In addition to reflection signals, the measured responses may include direct signal measurements that are useful for determining formation resistivity, permittivity, and permeability.

The operation and use of the disclosed tools are best understood in the context of the larger systems in which they operate. Accordingly, an illustrative logging while drilling (LWD) environment is shown in FIG. 1. A drilling platform 2 supports a derrick 4 having a traveling block 6 for raising and lowering a drill string 8. A top drive 10 supports and rotates the drill string 8 as it is lowered through a well head 12. The drill string (and/or a downhole motor) turns a drill bit 14 to extend borehole 16. Mud recirculation equipment 18 pumps drilling fluid from a retention pit 20 through a feed pipe 22 to top drive 10, down through the interior of drill string 8, through orifices in drill bit 14, back to the surface via the annulus around drill string 8, through a blowout preventer and back into the pit 20. The drilling fluid transports cuttings from the borehole into the pit 20 and aids in maintaining the borehole integrity.

The bottomhole assembly (i.e., the distal part of drill string 8) includes thick-walled tubulars called drill collars to add weight and rigidity to aid the drilling process. The thick walls of these drill collars make them useful for housing instrumentation and logging while drilling ("LWD") sensors. Thus, for example, the bottomhole assembly of FIG. 1 includes a tool assembly 24 having an electromagnetic logging tool and a control & telemetry module 26. Other tools and sensors can also be included in the bottomhole assembly to gather measurements of drilling parameters such as position, orientation, weight-on-bit, borehole diameter, etc. A downhole motor and steering mechanism can also be included in the bottomhole assembly.

As the bit extends the borehole through the formations, the LWD tool assembly 24 rotates and collects multicomponent radar measurements that a downhole controller associates with tool position and orientation measurements to form a three-dimensional map of the formation around the borehole. Control/telemetry module 26 collects data from the various bottomhole assembly instruments and stores them in internal memory. Selected portions of the data can be communicated to surface receivers 28 by, e.g., mud pulse telemetry. Other logging—while drilling telemetry methods also exist and could be employed. For example, through-wall acoustic telemetry can be employed with an optional repeater 30 to extend the telemetry range. As another example, the drillstring 8 could be formed from wired drillpipe that enables waveforms or images to be transmitted to the surface in real time to enable real time quality control and processing to optimize the logging resolution. Most telemetry systems also enable commands to be communicated from the surface to the control and telemetry module to configure the operation of the tools.

The surface receivers 28 communicate the telemetry signals to the computer system 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, a driller could employ this system to obtain a map of the formation boundaries or existing wellbores in the proximity of the bottomhole assembly. The driller can then employ a rotatable steering system or steering vanes to steer the drilling assembly and position the borehole as desired relative to formation boundaries or existing wellbores.

The orientation of the bottomhole assembly may be specified in terms of a tool face angle (rotational orientation), an inclination angle (the slope), and horizontal angle (compass direction). As is commonly defined in the art, the inclination angle is the deviation from vertically downward, the horizontal angle is the angle in a horizontal plane from true North, and the tool face angle is the orientation angle (rotational about the tool axis) from the high side of the borehole. (Since there is no "high side" in a vertical well, the rotational angle in such wells is measured from true North. It is for this reason that the rotational angle is often referred to as the "azimuthal angle", even in deviated boreholes.) Each of the orientation angles can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. The LWD tool assembly may include a position and orientation module that acquires such orientation measurements and combines them with gyroscopic or inertial measurements to accurately track tool position and orientation.

The electronics for the electromagnetic logging tool are housed inside the drill collar, whereas the antennas are located outside the collar, typically in a recess on the collar's surface as shown by the examples in FIG. 2. The recess can be filled with a non-conductive resin to support and protect the antennas. Alternatively, or in addition, a protective cover can be placed over the antennas. The cover can be made of conductive material so long as openings are provided to enable electromagnetic energy to be emitted and/or received.

As indicated in FIG. 3, loop antenna orientations can be specified in terms of a tilt angle $\xi$ and an azimuthal angle $\alpha$. The tilt angle $\xi$ is measured between the longitudinal axis of the tool and the antenna's normal vector N. The azimuthal angle $\alpha$ is in the plane perpendicular to the tool's longitudinal axis and it is measured between the tool face scribe line and the projection of the antenna's normal vector N.

Tool 110 (FIG. 2) has a triad of collocated antennas 112, 114, 116, with tilt angles of about 54.7° and azimuthal angle separations of 120° to provide orthogonality. Such a tool can provide a complete set of self- and cross-component measurements which can be used to synthesize the response of an arbitrarily oriented antenna. However, the triad antenna configuration poses certain manufacturing challenges which can be avoided with the use of a dual antenna system such as that of tool 100. Tool 100 has two antennas 102, 104 tilted at 45° and opposite azimuthal angles to provide orthogonality. In accordance with the teachings of co-pending U.S. patent application Ser. No. 12/294,557, "Antenna coupling component measurement tool having a rotating antenna configuration", the measurements taken as these two antennas rotate will, under certain assumptions, provide all the self- and cross-component measurements. If co-location of the antennas is deemed undesirable, the manufacturer can employ the configuration of tool 120 in which the antennas 122, 124 are spaced apart, though this may complicate signal processing and inversion.

As the tool rotates and progresses along the borehole, it acquires measurements and associates those measurements with a borehole position and an azimuthal angle. Nearby positions and angles may be grouped into "bins" and all measurements in each bin averaged or otherwise combined to improve measurement quality. FIG. 4 shows an illustrative division of the borehole circumference into N angular bins. N is usually greater than 8 and may typically be in the hundreds.

FIG. 5 is a block diagram of electronics for an illustrative embodiment of an electromagnetic logging tool. Digital-to-analog converters 502 produce analog transmit signals when supplied with a trigger signal or, in some implementations, a digital waveform. Transmitters 504 each provide frequency up-shifting, amplification, and impedance matching to efficiently drive a corresponding antenna 506. The antennas 506 operate to radiate electromagnetic energy into the formation and/or to receive electromagnetic energy from the formation. To protect the sensitive receiver electronics, time gates 508 decouple the antenna 506 from the receiver 510 when the respective transmitter is driving the antenna.

Otherwise, the receivers 510 provide amplification, filtering, frequency down-shifting, and gain control to suitably condition the receive signal for digitization by the analog-to-digital converters 512. Data buffers 514 enable the simultaneous operation of multiple receivers and transmitters without imposing overly stringent performance requirements on the tool's processor 516. The processor 516 writes desired measurement parameters to the appropriate buffer 514 (e.g., to select a particular antenna as the transmit antenna, to specify the desired signal amplitude, frequency, and pulse timing, and to specify a desired recording window) and after a suitable delay, collects the digitized waveforms from the desired receive antennas. The processor can store the measurement data in memory 518, process it if desired, and communicate it via a communications interface 520 across a telemetry channel to a data acquisition system at the surface.

In at least some embodiments, the antennas 506 are collocated multi-component antennas. The antennas shown in FIG. 2 are loop ("magnetic dipole") antennas, but orthogonally-oriented electric dipole antennas could also be used. Such antennas can be implemented or approximated by suitably oriented electrodes, wires, toroids, or horn antennas. In general, the processor 516 manages the transmission, reception, and processing operations for N collocated dipole antennas having linearly independent orientations to provide measurement data with more than one polarization. Magnetic dipole antennas can be implemented using tilted coils, non-tilted coils, solenoids, and/or magnetometers. The antenna dipole orientations may be chosen to be mutually orthogonal to optimize the directional or anisotropic sensitivity of the tool. Of course, measurements from differently-oriented antennas can be combined to determine the measurements that would be made by antennas of other orientations. Moreover, rotation of the drill string may be utilized to obtain data from different orientations. Some tool embodiments have antennas positioned at different locations along the drill string to improve imaging range and resolution.

FIG. 6 shows an illustrative logging method which may be performed by the downhole processor 516, by the surface computing facility 522, or cooperatively performed by both. In block 602 an initial transmitter is selected. In block 604, the selected transmitter is fired, and a digital waveform is responsively acquired from each receiver. A number of signal waveforms are contemplated for use, including isolated square, triangular, or Gaussian pulses. Chirps and other carrier-modulated pulses can also be employed. Repeated pulses can be used to improve signal to noise ratios, as can modulated continuous wave radar signals. Contemplated pulse widths include the range from 100 ps to 1 µs with widths below 100 ns being preferred, but other pulse widths may also be suitable. When the transceiver is in the receiving mode and the associated time gate is enabled, the signal received from the antenna is delivered to the data buffer. With the excitation of the ith transmitter, all receivers except i begin receiving data. In principle it is also possible to begin receiving from receiver i at this stage; however at least some embodiments delay recording on receiver i until the post-transmit ringing of the antenna has ceased or is negligible. After being in the reception mode for an adequate period of time, all receivers may be turned off.

In block 604 the tool's position and orientation are also captured and used to associate the receiver response measurements with an azimuthal bin. (An azimuthal bin has both an angular extent and an axial extent.) In block 606, the current measurements are used to update the average response for each receiver for the given bin.

In block 608, a test is made to determine whether additional measurements are needed or will be forthcoming at the current borehole position. For example, in tools having multiple transmitters, it is desired to have measurements from each transmitter. Other reasons for needing additional measurements include having a desired number of measurements within each azimuthal bin before additional processing is performed, or having at least a given number of azimuthally different measurements before additional processing is performed. If additional measurements at the current position are expected, the additional processing may be postponed until all the relevant measurements have been collected. The method repeats blocks 602-608 until a sufficient number of measurements have been acquired.

Once a sufficient number of measurements have been obtained at a given position in the borehole, the method continues optional pre-processing in block 610. For example, in block 610 the processor may combine measurements from different receivers to synthesize measurements of a virtual antenna which can be steered to maximize sensitivity in any given direction, or measurements may be processed to provide compensation for variations in tool electronics.

In block 612, the system processes the tool measurements to determine formation permittivity, resistivity, and permeability, as well as the distance and direction of any anomalies in the formation such as a bed boundary, a fluid boundary, a fracture or other form of formation void, an existing well bore, or any other subterranean feature in the vicinity that produces an electromagnetic contrast. Electromagnetic properties of the anomaly (e.g., resistivity, permittivity, and permeability) may also be determined. Certain inversion strategies are described further below to demonstrate the ease with which parameters can be extracted from the receive signals, but any standard formation property inversion may be employed, including library matching as well as iterative forward modeling. In block 614, a real-time display may be updated to reflect the latest measurements. In block 616, a test is performed to determine whether the logging process continues, and if so, the system returns to block 602. Otherwise, the system displays the measurement logs to a user in block 618. Contemplated logs include reflected self-component electromagnetic signal images, reflected cross-component electromagnetic signal (corner) images, permittivity/resistivity/permeability images of anomalies, azimuth/elevation angle images of anomalies, and permittivity/resistivity/permeability logs. The logs can also take the form of a volumetric image of the space around the borehole, or a graph of one or more formation properties as a function of tool position and orientation in the borehole. Other log displays are known and can be used.

Data acquisition may be repeated at various positions along the borehole. The waveform data obtained at different depths z may be represented as a voltage $V_{ij}(t,z)$, where subscripts i and j denote associated transmitter and receiver indices, and t represents time measured from the transmitter firing. Of course current, power, or some other waveform measurement variable can also be used. The voltage $V_{ij}(t,z)$ may at times be referred to as an image because of the dependence on two dimensions (time t and depth z). As indicated in FIG. 7, self-component voltage data (i.e. i=j) usually shows functions of arbitrary contrasts in permittivity $\epsilon$, permeability $\mu$, or resistivity $\rho$. Cross-component voltage data (i.e. i≠j), usually shows functions of dipped or corner features of permittivity $\epsilon$, permeability $\mu$, or resistivity $\rho$, provided that the orientation of the dipoles are approximately orthogonal and the formation medium is isotropic.

The images may be displayed at this stage or, as indicated in FIG. 7, they may be further processed or inverted to yield improved voltage images or permittivity/resistivity images as a function of radial distance d and depth z. In applicable cases, inversion can produce parameters associated with anomalies, such as the anomaly distance $d_a$, and direction (i.e., azimuth angle $\phi_a$, and elevation angle $\theta_a$). Inversion can be performed either by comparing the waveform data to a library of pre-compiled voltage responses, or by utilizing a forward model in an iterative manner to find the model parameters that produce a predicted response that best fits the actual measurements. The library may be composed of data time, data depth, background permittivity/resistivity, anomaly distance, anomaly azimuth or anomaly elevation parameters. The library may include more or less parameters depending on the desired flexibility in range of problems that needs to be solved. In problems which are not covered by the range of parameters in the library, permittivity, permeability, resistivity or voltage images may still provide adequate information regarding anomaly parameters upon visual inspection. For example, peaks of the reflected signal may provide relative distance information, even if an accurate distance measurement were not available.

Due to multi-component nature of the tool, different transmitters can excite electromagnetic waves of different polarizations that create a directional dependence in the received signal data. As a result, it is possible to obtain direction to anomaly from the $V_{ij}(t,z)$, waveforms. For example, assume multi-component data is obtained from an orthogonal set of dipoles $V_{ij}(t,z)$, i=1, 2, 3, j=1, 2, 3. The data tensor at each time and depth can be written as $$\overline{\overline{V}}(t, z) = \begin{bmatrix} V_{11}(t, z) & V_{12}(t, z) & V_{13}(t, z) \\ V_{21}(t, z) & V_{22}(t, z) & V_{23}(t, z) \\ V_{31}(t, z) & V_{32}(t, z) & V_{33}(t, z) \end{bmatrix} \quad (1)$$

In layered isotropic media, the eigenvector expansion of this matrix would (at least approximately) has the form $$\overline{\overline{V}}(t, z) = \overline{\overline{USU}}^{-1} = [\overline{u}_\perp \ \overline{u}_A \ \overline{u}_B] \begin{bmatrix} s_\perp & 0 & 0 \\ 0 & s & 0 \\ 0 & 0 & s \end{bmatrix} [\overline{u}_\perp \ \overline{u}_A \ \overline{u}_B]^{-1} \quad (2)$$

where s and $s_\perp$ are constants proportional to the reflection coefficients associated with dipoles parallel and perpendicular to the layer boundary, respectively. $\overline{u}_\perp$ is defined here as the eigenvector associated with eigenvalue $s_\perp$, and it is equal to the normal vector of the layer boundary. When combined with the information about the orientation of the tool antennas, the vector $\overline{u}_\perp$ indicates azimuth and elevation of the layer boundary relative to the tool. By collecting the azimuth and elevation values at each (t,z) point, an azimuth image and an elevation image can be constructed. This image indicates the approximate direction of source that is mostly contributing to each $V_{ij}(t,z)$ voltage value. In the case of a problem with a single layer, it is possible to uniquely solve for the position of the layer boundary at each individual depth point. Similarly, in the presence of a linear (one-dimensional) scatterer (such as the casing of a nearby well), the eigenvector expansion of (1) takes the form $$\overline{\overline{V}}(t, z) = \overline{\overline{USU}}^{-1} = [\overline{u}_\perp \ \overline{u}_A \ \overline{u}_B] \begin{bmatrix} s_\perp & 0 & 0 \\ 0 & 0 & 0 \\ 0 & 0 & 0 \end{bmatrix} [\overline{u}_\perp \ \overline{u}_A \ \overline{u}_B]^{-1} \quad (3)$$

where $s_\perp$ is a constant proportional to the reflection coefficient associated with the linear anomaly. $\overline{u}_\perp$ is defined here as the eigenvector associated with eigenvalue $s_\perp$, and it is contained within the plane that intersects both the linear anomaly and the transceiver. Unlike the layered case in equation (2), $\overline{u}_\perp$ here may not by itself indicate the direction of the linear anomaly. However, when information from multiple measurements is combined, the direction can be found by intersecting the resulting planes.

The foregoing discussion demonstrates examples whereby it is possible to determine anomaly direction without first inverting the time domain waveforms. Where it is desired to have an accurate distance measurement to the anomaly, it is desirable to convert the time axis of the images to a distance axis. Since permittivity, resistivity and permeability values may have frequency dependence which may complicate distance calculation, a correction may be applied to the data a-priori to remove this frequency dependence. One way in which this can be done is to Fourier transform the waveform data into the frequency domain, to apply a frequency-dependent multiplicative factor based on a known, measured or guessed frequency dependence, and then to transform the product back to the time domain. While such a correction is expected to be helpful, it may be unnecessary in many cases.

With or without frequency dispersion corrections, the time-domain image data is inverted either by finding the closest match in a library or by employing an iterative forward modeling technique to find a model whose predicted response matches the measurements. The initial model parameters include the background permittivity, resistivity and permeability values. The inverted resistivity and permittivity values may be isotropic or anisotropic. If desired, the correction for frequency dispersion can be incorporated in the inversion step and the inverted parameters may also be functions of frequency. To determine the formation properties in the immediate vicinity of the tool, the waveform data may be windowed to include only the time range that begins with the end of the pulse transmission and ends before any strong reflections are received. After the formation permittivity, resistivity and permeability values are obtained, an effective wave speed v(t), is calculated for the given pulse. Since the time-domain waveform reflects a two-way travel time, the calculated speed is halved before being used to convert the time axis into a distance axis. Those anomalies that are made evident by peaks in the waveform which represent reflections can have their distances determined to be $0.5 \int_{t_0}^{t_p} v(t) dt$ where $t_p$ is the time of the peak observed at the receiver. This associates each voltage value $V_{ij}(t,z)$ with the approximate distance of source that is mostly contributing to it. In layered media, reflection from the anomaly usually appears as local fluctuations in the signal level and peak magnitude of these fluctuations are observed at a distance equal to the shortest distance from the transceiver to the layer boundary. In cases where reflected field is shadowed by the direct field, filtering may be used to reduce the direct field effects.

In the contemplated operating regime of this tool, the direct (self-coupled) signal from the transmitter decays very quickly after the transmission phase and is expected to be mostly separated from the anomaly reflections in time. In the examples that follow, a peak in the received signal is considered detected only if it is larger than a certain percentage of the direct signal. This percentage is chosen conservatively here as 10%. A second detection criterion for these examples is the absolute signal level of the reflected signal. Peaks in the receive signal are considered detected here if they are above $5 \times 10^{-9}$ times the peak of the direct signal level. Even better tool performance can be obtained by reducing the direct signal, which can be done by filtering out the decaying part of the direct signal. One approach would be to find the functional form of the decaying function based on an early time interval and subtract that decaying function from all following times. Finally, the direction information obtained from (1)-(3) can be combined with the distance information to locate the anomalies.

Figure 8:
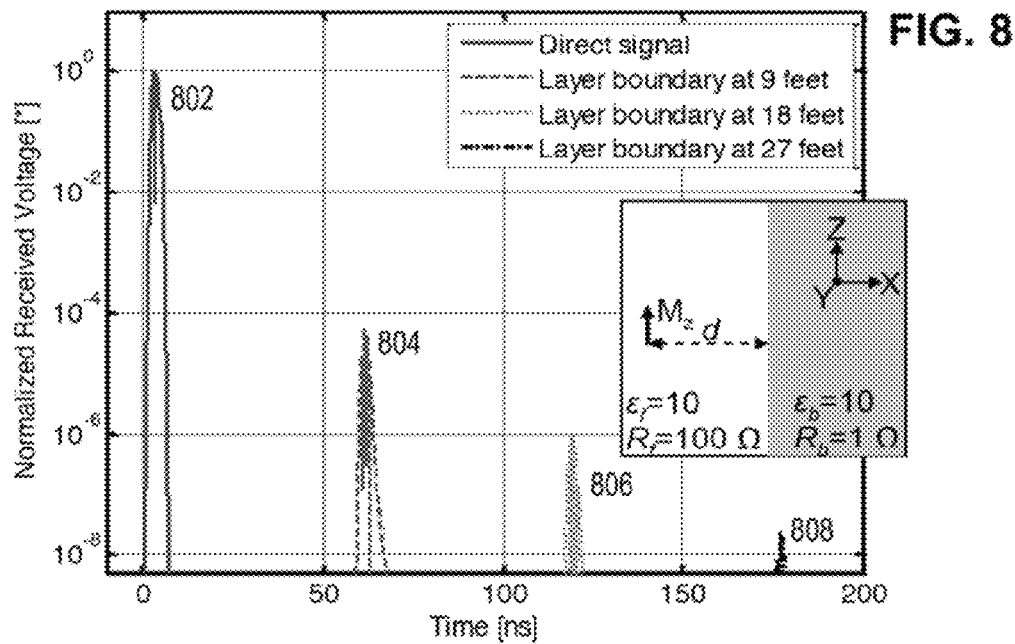
FIGS. 8-13 are graphs of received signal pulse magnitudes vs time for different logging conditions.
Figure 9:
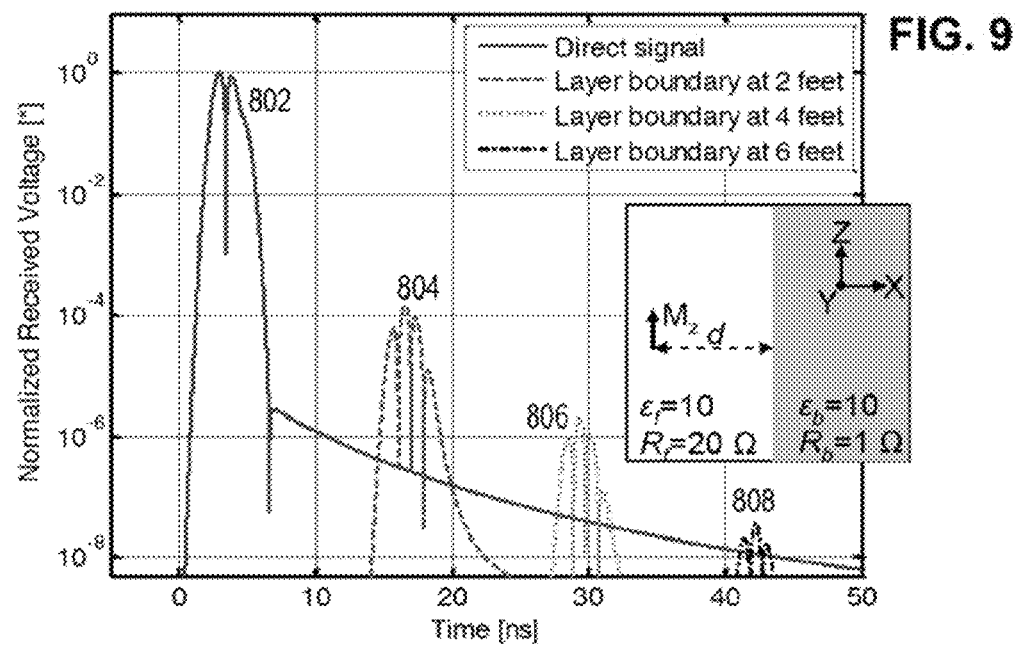
Figure 10:
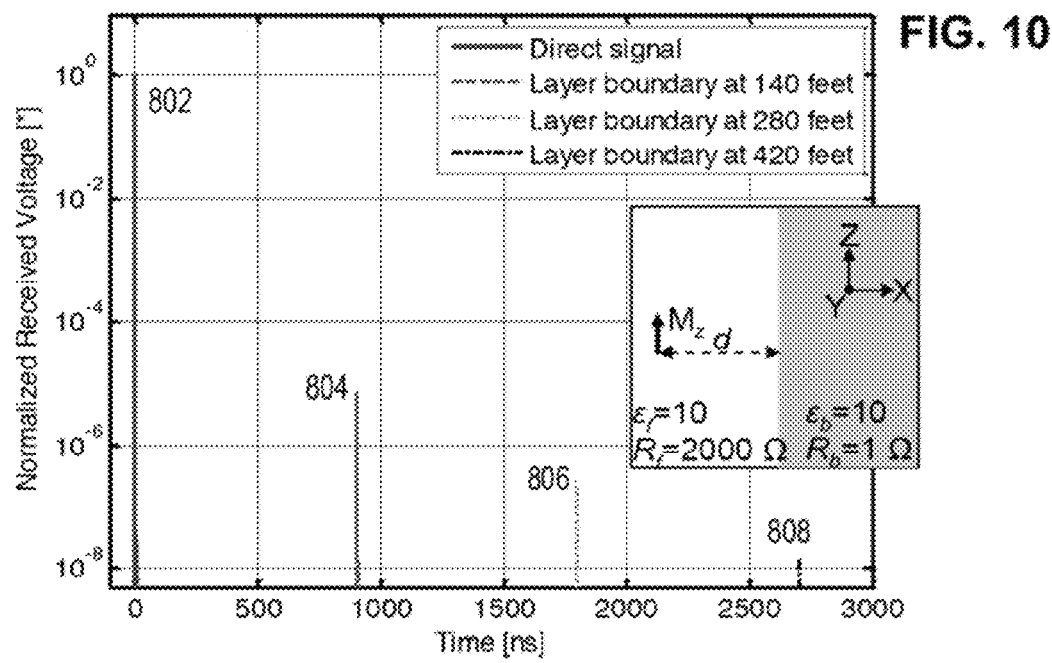

FIG. 8 shows the voltage $V_{zz}(t)$ measured with a tool with z-dipole transceiver in a two layer formation having the geometry shown in the inset. The amplitude of the direct signal is shown, as well as that of the reflected signal for a boundary at one of the following distances: 9 feet, 18 feet, and 27 feet. The formation in the immediate vicinity of the tool has a relative permittivity $\epsilon_f=10$ and resistivity $R_f=100$ $\Omega$m, while the boundary is with a formation having a relative permittivity $\epsilon_f=10$ and resistivity $R_b=1$ $\Omega$m. In this example, the pulse width was chosen to be 7.0704 ns and it is expected to provide a distance resolution of about 0.5 feet in this example. (Resolution here means the smallest separation between two layers that could be distinguished by the transmitted pulse). The maximum value of the received voltage is normalized to 1. In the figure line 802 represents the direct signal and the other lines 804, 806, 808 respectively represent reflected signals from a layer boundary at 9', 18' and 27'. As can be seen from the figure the reflections at each of these depths are well separated from the direct signal and from each other. For a relative threshold level of $5 \times 10^{-9}$, the expected depth of detection is around 30'. FIGS. 9 and 10 show similar plots for different formation resistivity values of $R_f=20, 2000$ $\Omega$-m, respectively. Expected depths of detection in these cases are calculated as 6' and 450' respectively. By comparing the figures we observe that as the formation conductivity gets higher, a ringing effect is observed after the pulse transmission is ceased. The ringing effect in each of these cases is lower than the reflection levels and is not expected to have any significant effect on depth of detection.

Figure 11:
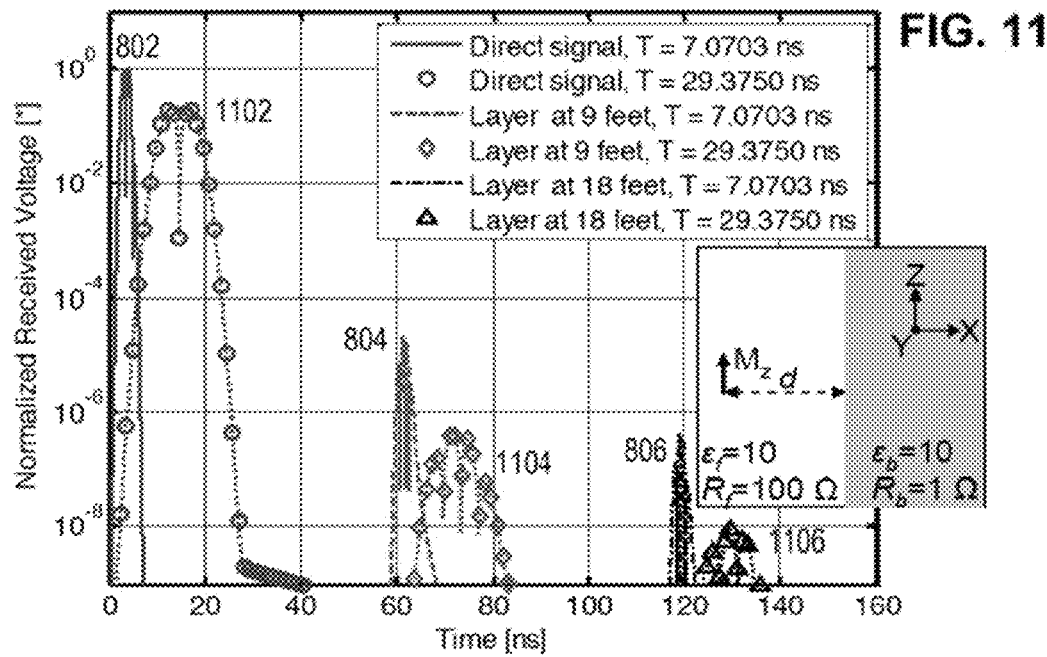

FIG. 11 compares the signals from FIG. 8 with the signals that would result from a longer pulse width (29.375 ns) in the same situation. Curve 1102 represents the direct signal, curve 1104 represents the reflection from a boundary 9 feet away, and curve 1106 represents the reflection from a boundary 18 feet away. The longer pulse width corresponds to an expected distance resolution of about 2 feet (versus 0.5 ft for the short pulse width). With the longer pulse width, the amplitude of the reflections relative to the direct signal is decreased by about 10%, and there is an increased ringing effect (i.e., a longer decay) in the direct signal. This comparison suggests that it may be more advantageous to employ the short pulse widths.

Figure 12:
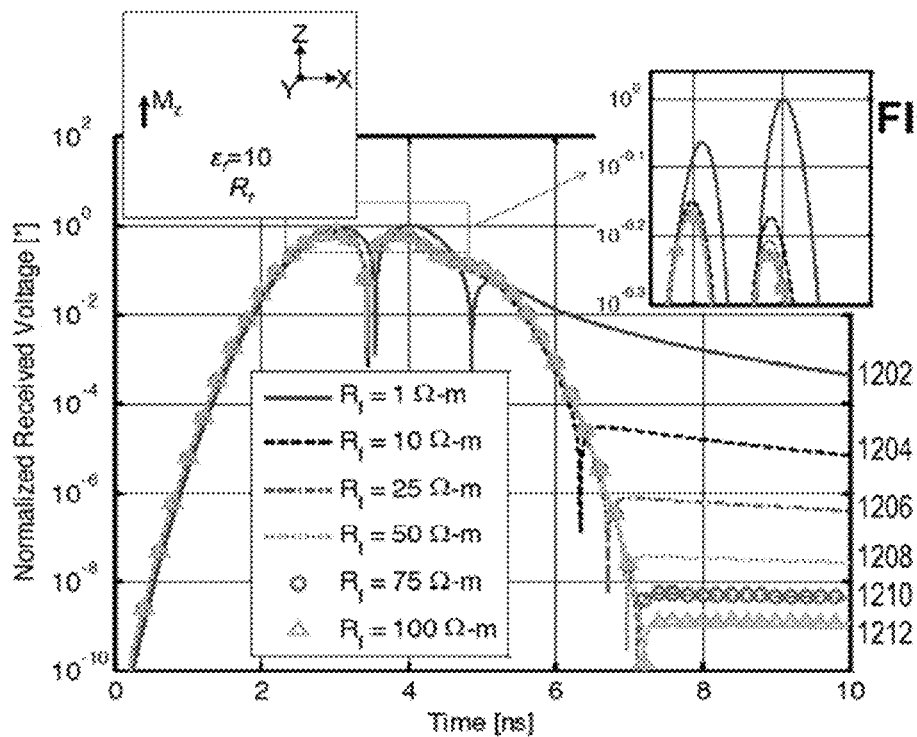

FIG. 12 demonstrates the effect of the formation resistivity on the direct signal for a z-dipole transceiver. Curves 1202-1212 correspond to the signals for formation resistivities 1, 10, 25, 50, 75, and 100 $\Omega$m. The figure demonstrates that the received voltage after the end of the pulse (t=7.0704 ns) is highly dependent on the resistivity value. The inset also shows a more limited sensitivity during the pulse transmission. This figure suggests that the resistivity of the formation in the immediate vicinity of the tool can be most effectively obtained by processing the measured signals after the end of the transmitted pulse, though it is also possible to obtain it from voltage values during the transmission if the tool is capable of transmitting and receiving at the same time.

Figure 13:
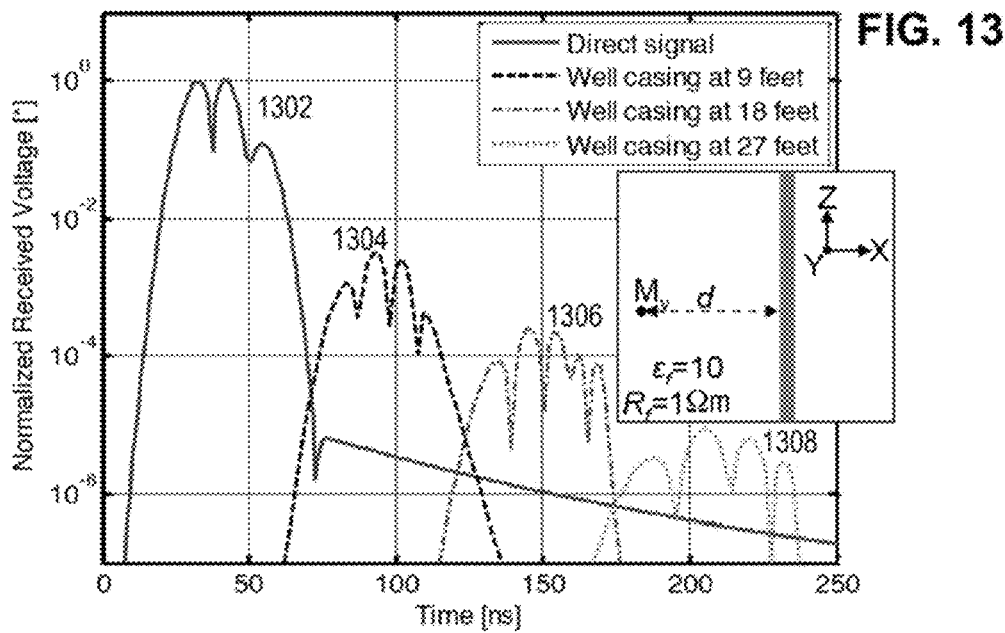

FIG. 13 shows an expected tool response to an existing (highly conductive) well casing in a formation having a relative permittivity $\epsilon_f=10$ and resistivity $R_f=1$ $\Omega$-m. The well casing is 8 inches in diameter and is assumed to extend longer than 500 feet in both directions along an axis that is parallel to the tool's z-axis, and the magnetic dipole antenna is oriented along the y-axis. The tool transmits a 7.0703 ns pulse with Gaussian shape. Curve 1302 represents the direct signal, curve 1304 represents the reflection with the casing at a distance of 9 feet, curve 1306 corresponds to a casing distance of 18 feet, and curve 1308 corresponds to a casing distance of 27 feet. The figure shows that the behavior and level of the reflected signals is similar to those from planar boundaries at similar distances. We expect that all of the principles used for detecting and tracking planar boundaries can be translated with small changes to provide detecting and tracking of cased wells. One significant difference is that optimal excitation of well casing occurs when the dipole is normal to the plane that contains both the dipole and the well casing (as evident from equation (3)). The reflected signals are larger than both the direct signal and a relative noise level at $5 \times 10^{-9}$ for all distances considered. Depth of detection in this case is estimated to be larger than 40'. Accordingly the tool can be used to intersect, avoid, or drill parallel to an existing well.

Figure 14:
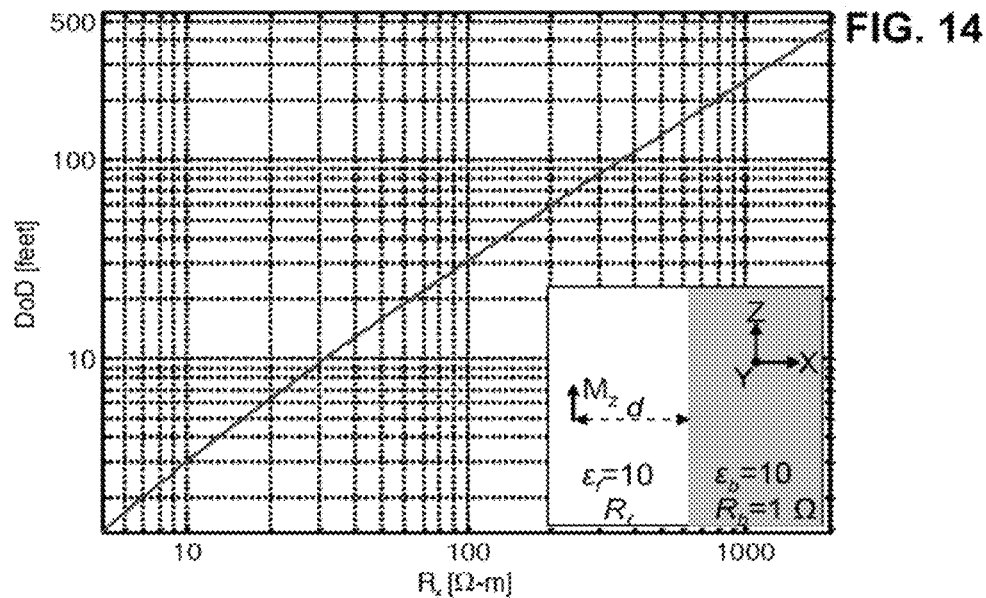
FIGS. 14-16 are graphs of detection range as a function of various parameters.

FIG. 14 illustrates how the expected depth of detection for a planar boundary varies with formation resistivity. The assumed model is shown in the inset, with the formation containing the tool having a permittivity $\epsilon_f=10$ and resistivity $R_f$, and the bounding formation having a permittivity of $\epsilon_f=10$ and resistivity $R_b=1$ $\Omega$m. Width of the pulse is chosen as 7.0704 ns. As with the other experiments, detected is assumed only if the boundary produces a reflection larger than $5 \times 10^{-9}$ times the maximum of the direct signal and is larger than 10% of the direct signal at the time it is received. The figure shows that the depth of detection increases nearly linearly with resistivity.

Figure 15:
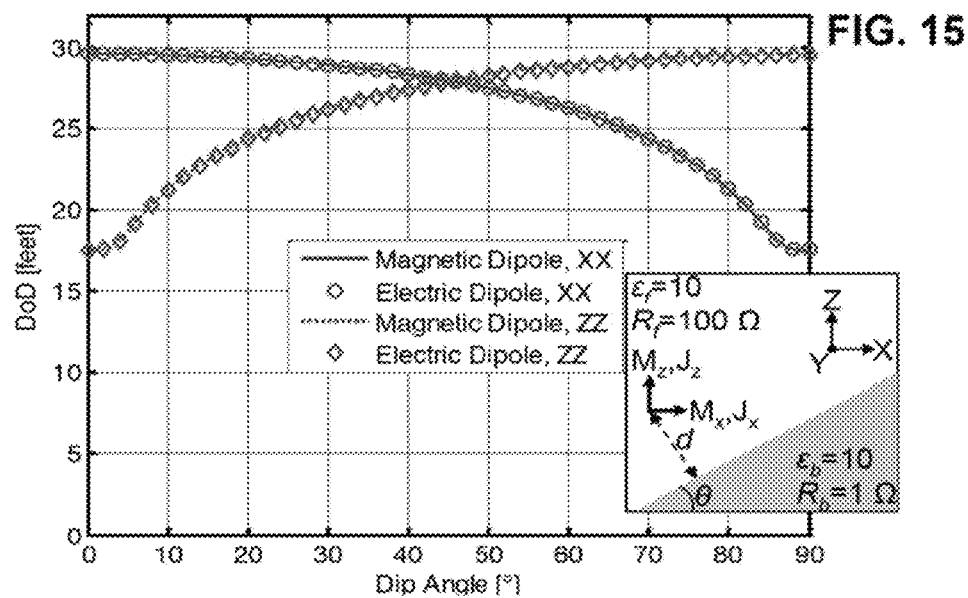

FIG. 15 shows the depth of detection associated with electric and magnetic dipole transceivers in X and Z directions. The tool is in a layer with relative permittivity $\epsilon_f=10$ and resistivity $R_f=1$ $\Omega$m, with a dipping boundary layer having a relative permittivity $\epsilon_f=10$ and resistivity $R_b=1$ $\Omega$m. Width of the pulse is chosen as 7.0704 ns. This figures illustrates the dependence of the detection distance on the dip angle $\theta$. The distance is measured from the transceiver to the closest point on the layer boundary. The figure shows that electric and magnetic dipoles result in exactly the same depth of detection, mainly due to duality of electric and magnetic propagation phenomenon. For the antenna dipole oriented parallel to the plane, a 30' depth of detection is observed, and it falls to 17' as the antenna becomes perpendicular to the planar boundary. This observation suggest that an X transceiver is more suitable for detecting boundaries ahead of the bit, whereas a Z transceiver is more suitable for tracking boundaries to the side of the drill string.

Figure 16:
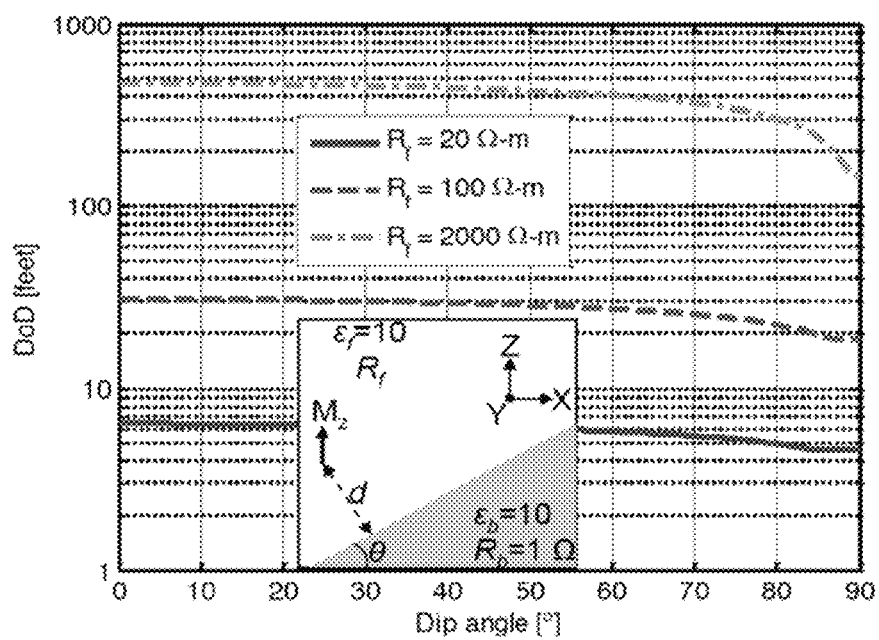

FIG. 16 shows how the dip angle dependence of the depth of detection varies for different formation resistivities. Curves are shown for three different resistivity values $R_f=20, 100, 2000$ $\Omega$-m, and in each case the bounding layer has a relative permittivity $\epsilon_f=10$ and resistivity $R_b=1$ $\Omega$-m. Width of the pulse is chosen again as 7.0704 ns, and the X-dipole transceiver is used. The depth of detection increases for higher formation resistivities, but incurs a larger percentage loss at high dip angles.

Figure 17:
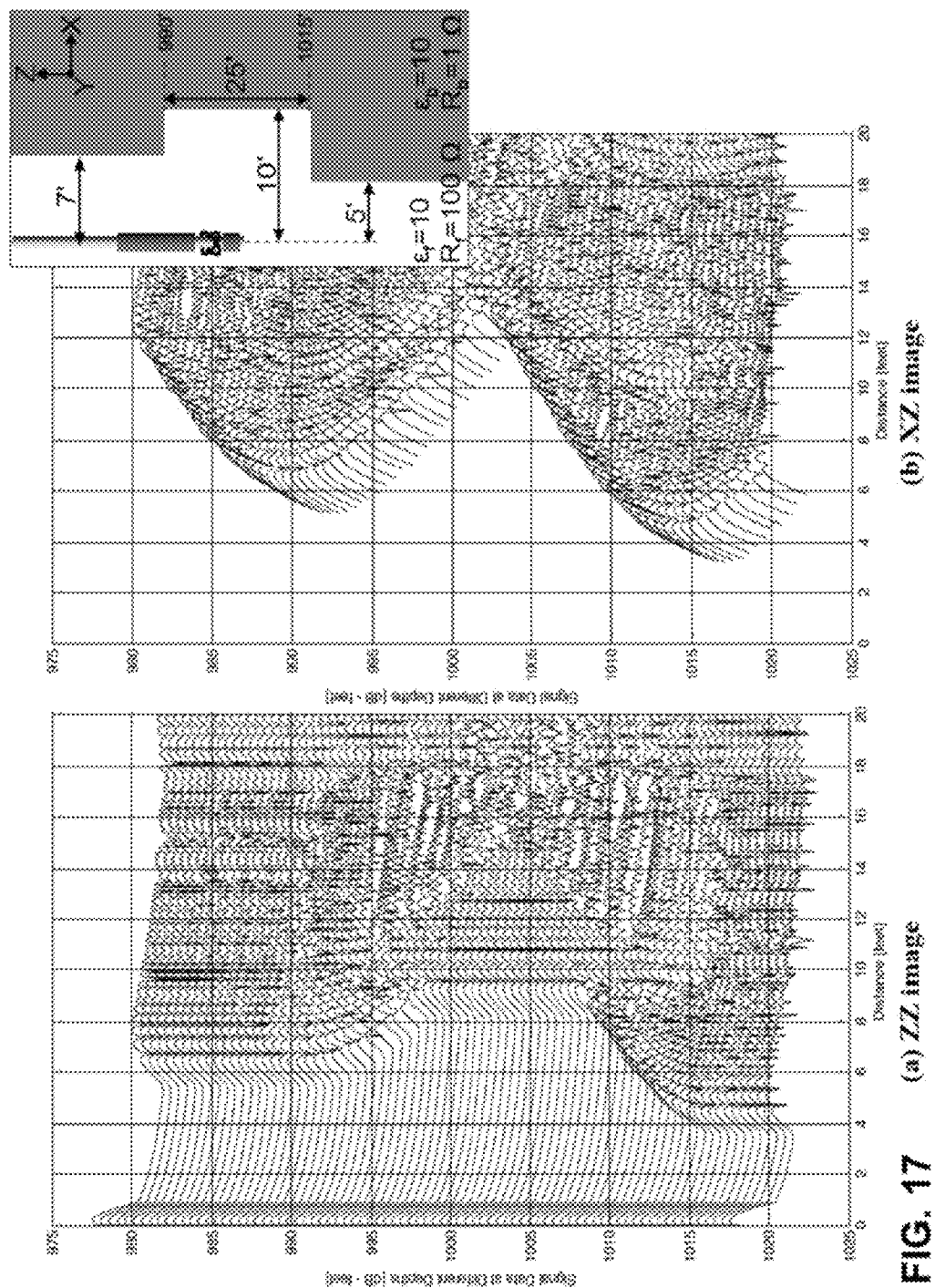
FIGS. 17-18 show illustrative signal responses as a function of tool position.

We turn now to the variation of the signals with depth. FIGS. 17a and 17b respectively show images obtained from the $V_{zz}(d,z)$ and $V_{xz}(d,z)$ waveforms. The assumed formation structure is illustrated in the inset figure. The formation has a relative permittivity $\epsilon_f=10$ and resistivity $R_b=100$ Ω-m, and the bounding formation has a permittivity $\epsilon_f=10$ and resistivity $R_b=1$ Ω-m. However, the boundary is not strictly planar, but rather has three rectangular faces at distances of 7', 10', and 5' from the path of the tool. The central face spans 25' along the path of the tool. This structure could for example be what is known as a cave. The structure is y-invariant and extends both in -y and +y directions. The $V_{zz}(d,z)$ and $V_{xz}(d,z)$ measurements are extracted from measurements by a two tilted-antenna tool in this case with 45 degree tilt at 0 and 180 degrees azimuth angle respectively. Tilted coil results are convened to results associated with (imaginary) X and Z dipoles by addition and subtraction operations on different channels. A 15 ns pulse with Gaussian shape was used. Each curve in the figure is the signal data associated with and centered to a particular position on the borehole path. The original time axis is convened to distance by the method described previously.

FIG. 17a shows reflections from the cave boundary (visible in the distance range 4 feet to 11 feet) are decoupled from the direct signal (visible in the range 0 to 1 feet). These reflections make up an image of the cave boundary and the distance to each boundary face can be successfully recovered from this image. FIG. 17b shows a cross-component (XZ) image that is sensitive to corner features of the cave. (The cross component measurement in this case is the signal that would be received by the virtual z antenna in response to a pulse transmitted from the virtual x antenna.)

FIGS. 18a and 18b show voltage images $V_{zz}(d,z)$ and $V_{xz}(d,z)$ that are obtained with the structure illustrated in the inset figure. The electromagnetic properties of the formation and bounding layers are as before, but n this case there are two boundary faces, the first of which slopes away at 14.03° with the z axis and the second of which slopes closer at an angle of 36.87° to the z axis. This structure could for example be what is known as a geological fault. As before, a two tilted-antenna tool is used to obtain the $V_{zz}(d,z)$ and $V_{xz}(d,z)$ waveforms that would result from a 15 ns pulse with Gaussian shape. FIGS. 18a and 18b show that the reflected signal data from the fault successfully form an image of the fault boundary in both self-(ZZ) and cross-(XZ) components. As expected, direct signal is observed only in the self component, but not in the cross-component. This factor may be useful for removing unwanted direct component effects.

Figure 18:
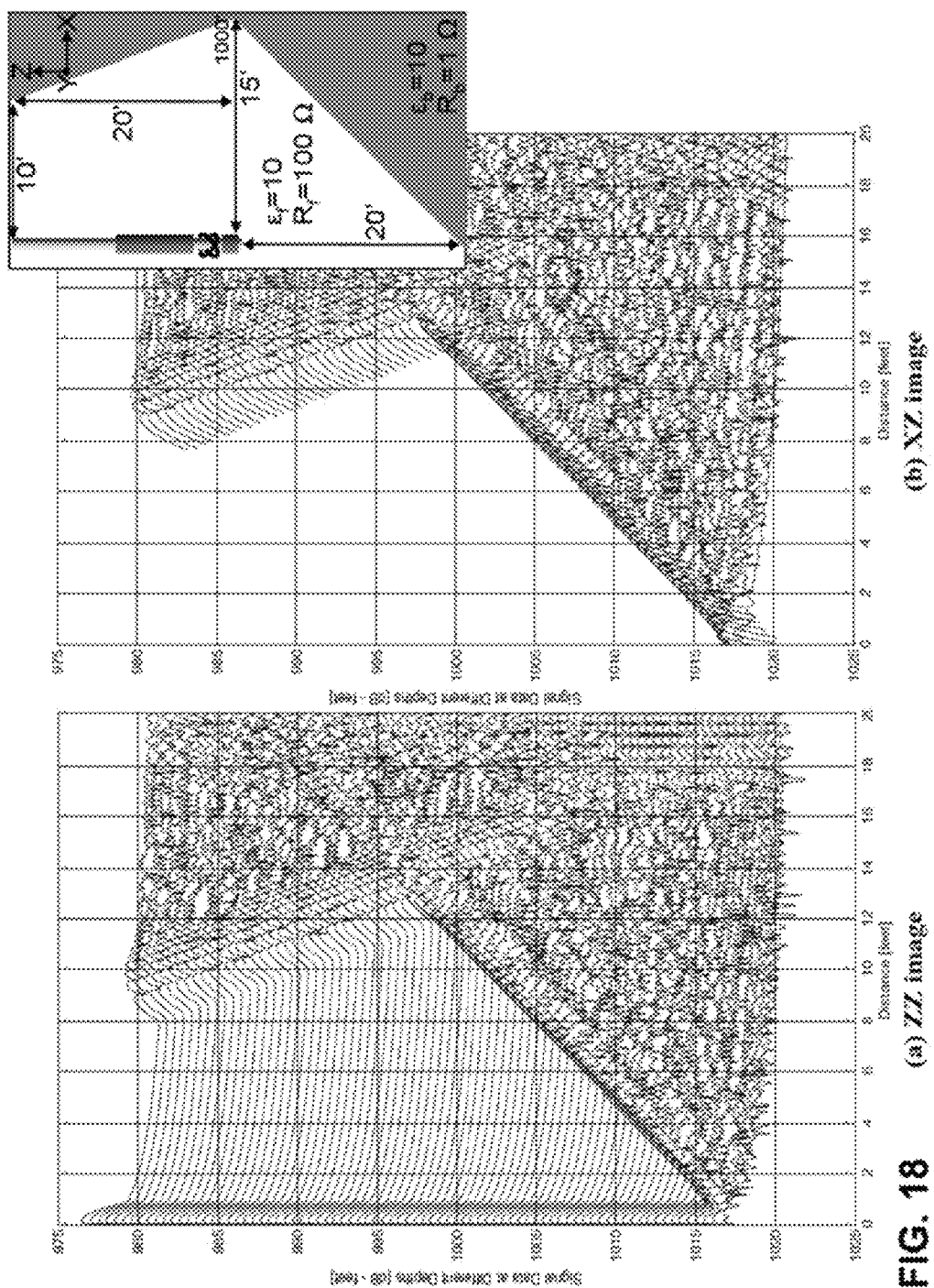
Figure 19:
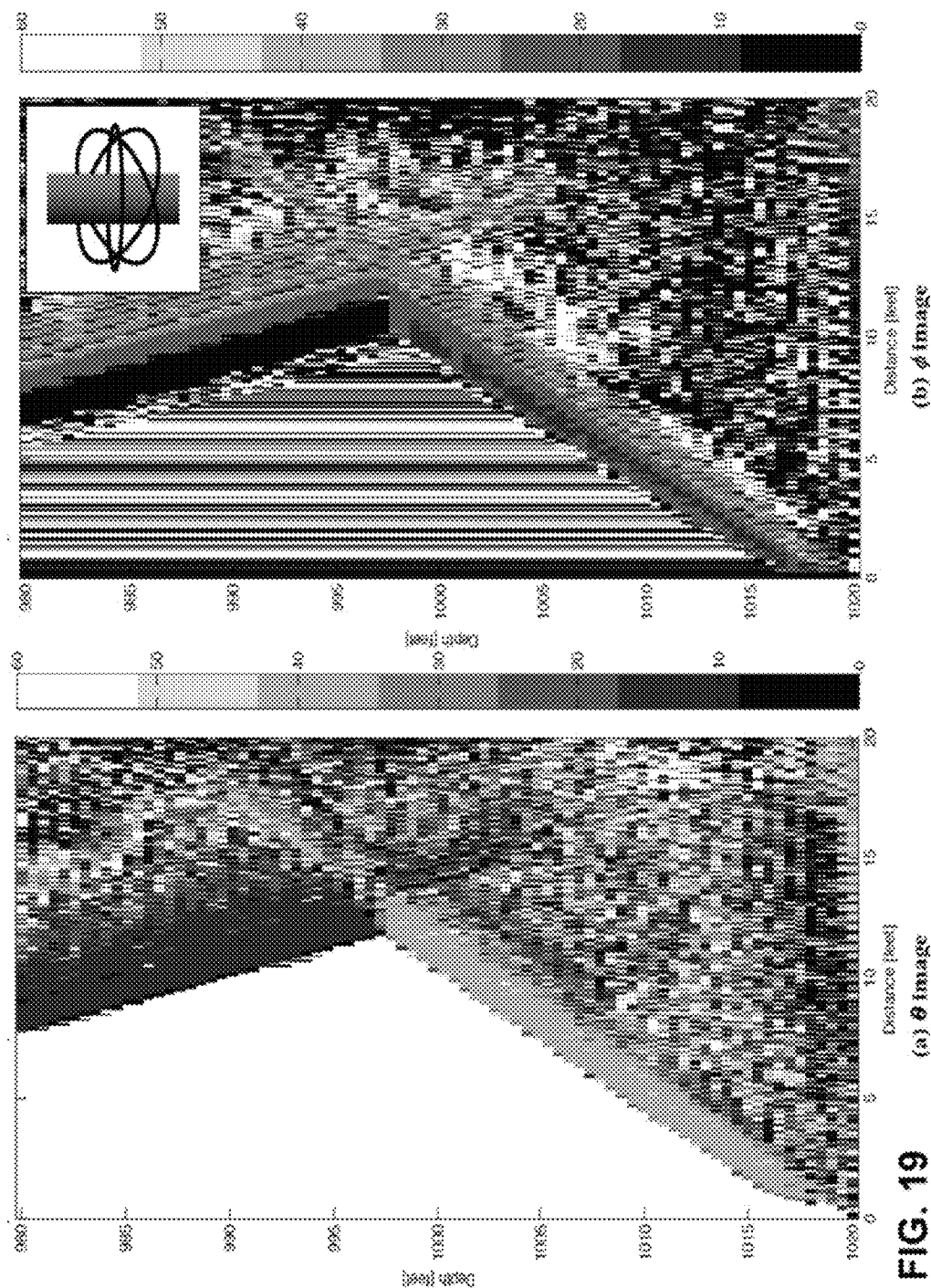
FIG. 19 shows directional information extracted from the signal responses of FIG. 18.

FIG. 19 shows the result of applying the previously outlined direction finding approach to the measurements from a three tilted antenna coil tool in the formation structure of FIG. 18. As indicated by the inset, each of the three antennas is tilted at 35.26° from the z-axis at azimuths of 0, 120°, and 204°. These special angles make the coils mutually orthogonal allowing natural multi-component operation. Tilted coil results are converted to results associated with virtual X, Y and Z dipoles by addition and subtraction operations on different channels. FIG. 19a shows the calculated elevation angle $\theta(d,z)$ image, while FIG. 19b shows the calculated azimuth angle image $\phi(d,z)$. It can be seen from the figure that a stable measurement for both the azimuth and elevation angles of the signal from the fault is obtained especially when close to the peak of the reflected signal (notice the bands of same color). This verifies that a distance-specific measurement of dip is being made.

To determine an anomaly elevation, azimuth and distance measurement at each depth, the system first identifies the peak magnitude of the reflected signal and then employs the values associated with that particular depth as provided below:

$$d_{measured}(z) = \underset{d>\gamma}{\mathrm{argmax}}(|V(d,z)|), \quad (4)$$

$$\theta_{unmeasured}(z) = \theta(d_{measured}(z), z), \quad (5)$$

$$\phi_{measured}(z) = \phi(d_{measured}(z), z). \quad (6)$$

Figure 20:
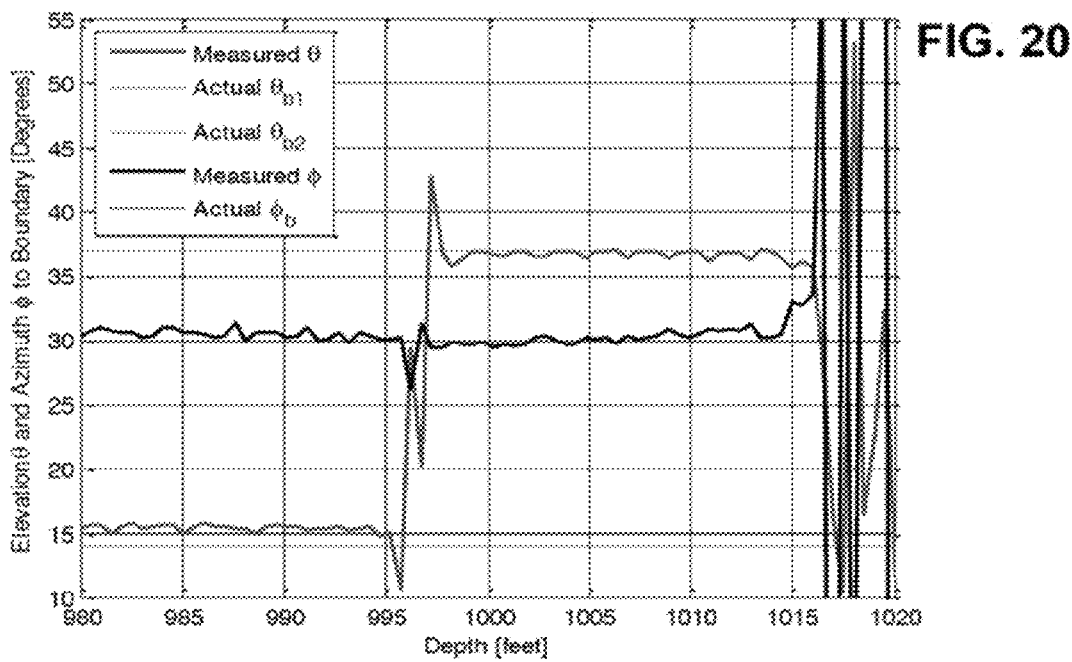
FIGS. 20-21 show distance and direction values derived from the signal responses of FIG. 18.
Figure 21:
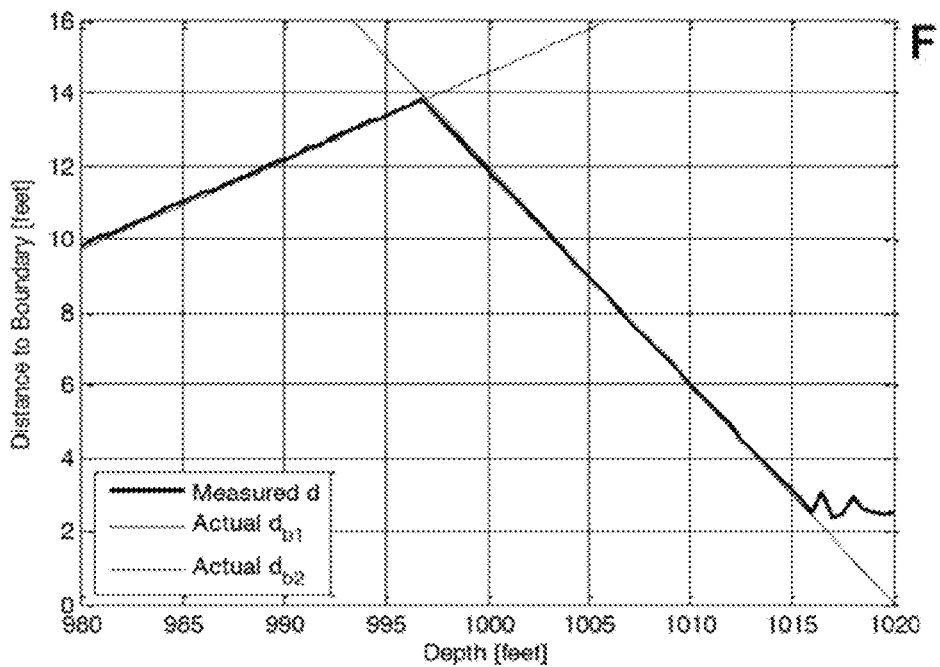

FIG. 20 shows the calculated elevation and azimuth angles which have been extracted according to this procedure, while FIG. 21 shows the calculated distance to the detected boundary. (It should be noted that the distance, elevation angle, and azimuth angle to the layer boundary are measured with respect to the point on the boundary that is closest to the transceiver.) In the figures, the upper face boundary is denoted as b1 and the lower face boundary is denoted as b2. It can be seen from the figures that all elevation, azimuth and distance values match with the actual values and they are successfully and accurately measured.

The inaccuracies near the end of the FIGS. 20-21 are due to the proximity of the anomaly and the direct field's contamination of the reflected field. In this example the minimum distance that allows non-contaminated measurement is around 2.5 feet, and it can be reduced by reducing the width of the pulse. It should be noted there that Equations (4-6) can be generalized to identify multiple anomalies. In that case multiple peaks and associated values at those peaks would be identified.

Figure 22:
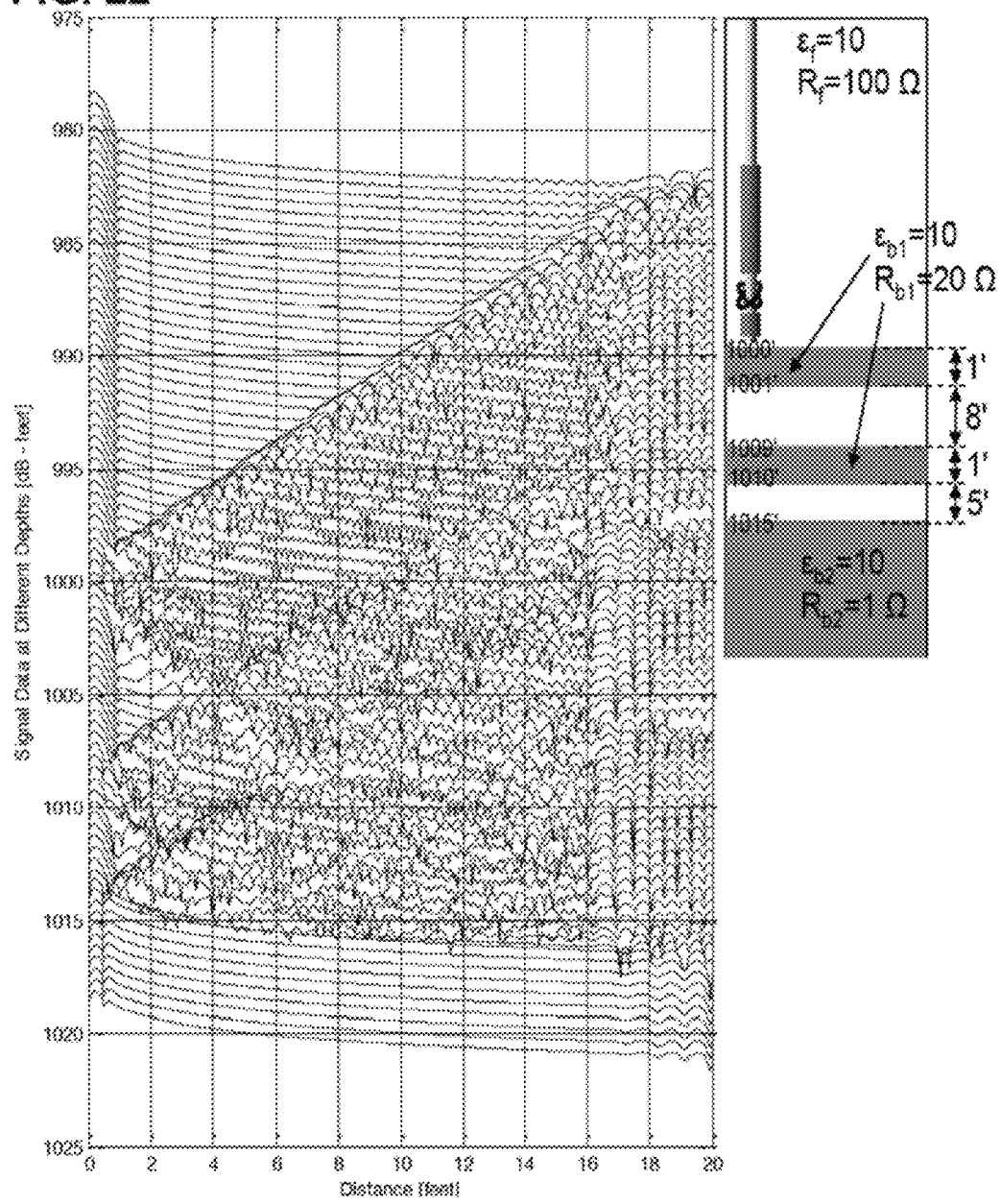
FIGS. 22-23 show illustrative signal responses as a function of tool position.

FIG. 22 shows the voltage image $V_{yy}(d,z)$ derived from measurements by a two tilted-antenna tool (with 45° tilt at 0 and 180° azimuths) as it moves through a sequence of formation beds. As illustrated by the inset figure, each of the formation layers has a relative permittivity of 10, and the following resistivities in order from top to bottom: 100 Ω-m, 20 Ω-m, 100 Ω-m, 20 Ω-m, 100 Ω-m, and 1 Ω-m. The topmost formation is 1000 foot thick and the subsequent layers are 1 ft, 8 ft, 1 ft, 5 ft, and 10 ft. The signal pulse is Gaussian with a 15 ns pulse width. The figure shows that reflections from the first thin layer can be observed even when the tool is approaching from 20' away. The peak values of the reflections indicate the distance to the layers that produce the reflection. For example, as the tool moves along the z axis from 980' to 1000', the peak of the reflection signal correspondingly moves from about 20' to 0' indicating the proximity of the approaching layer. This confirms the look-ahead capability of the tool.

Figure 23:
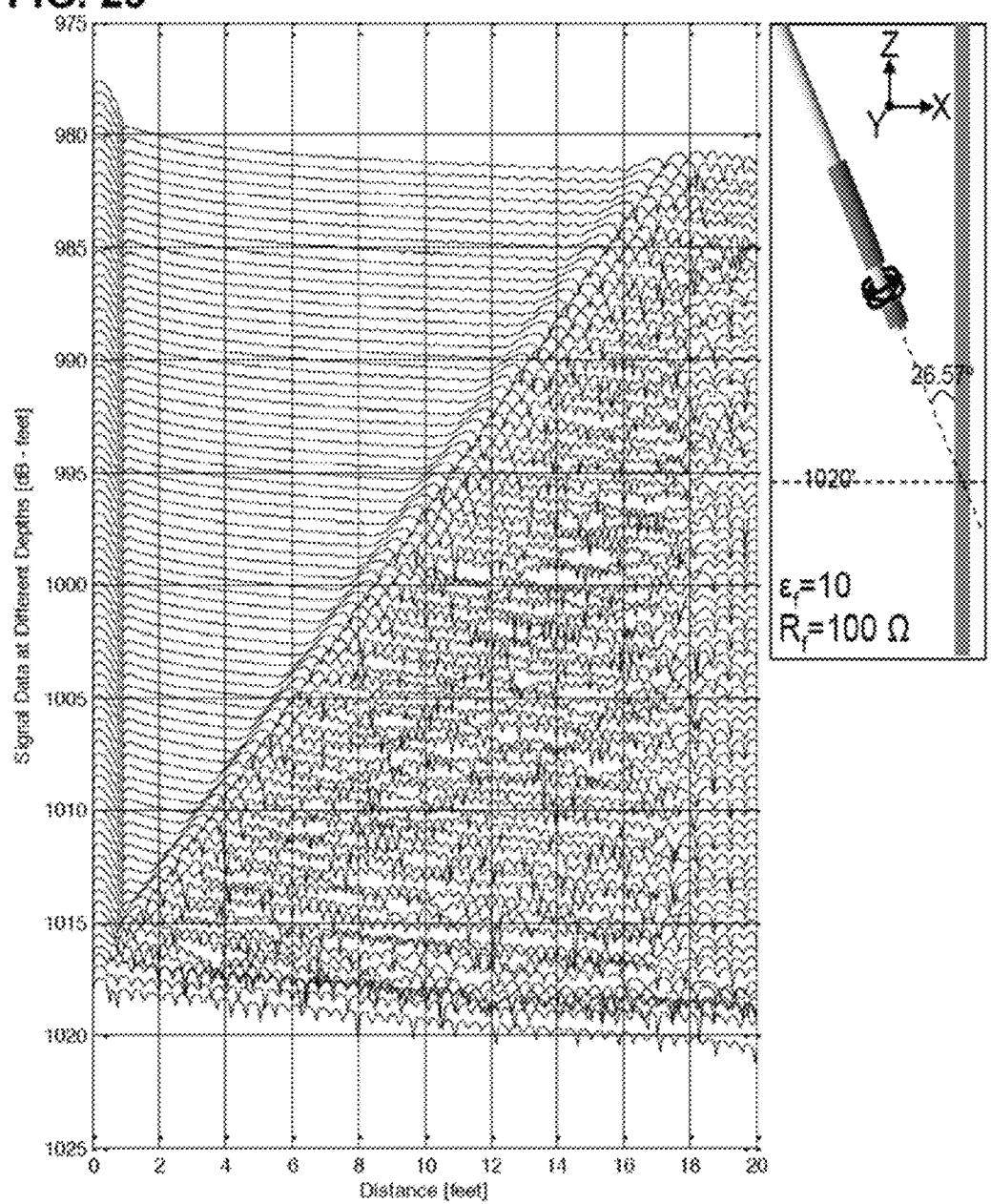
Figure 24:
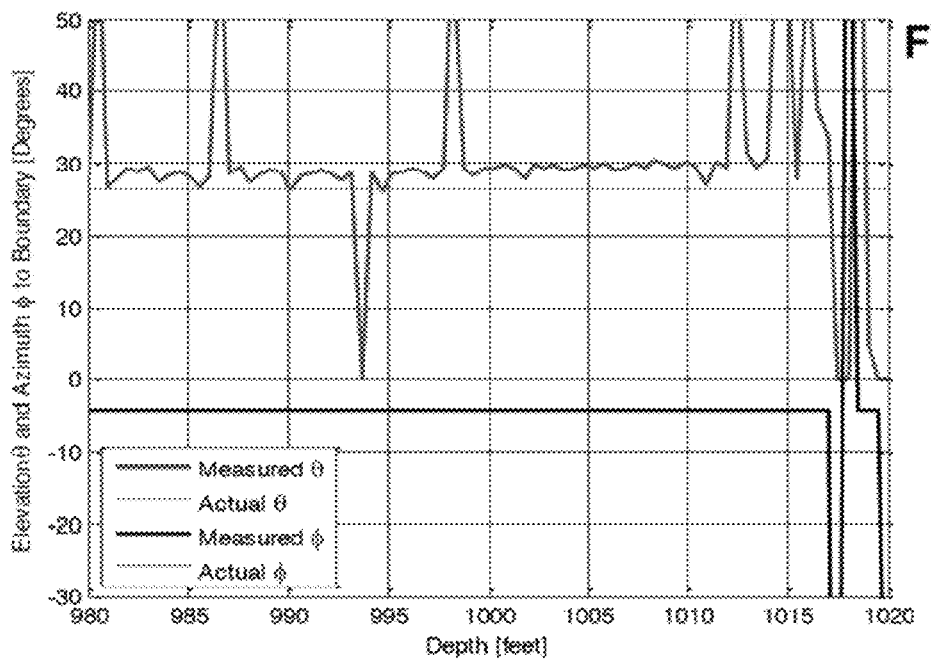
FIGS. 24-25 show distance and direction values derived from the signal responses of FIG. 23.
Figure 25:
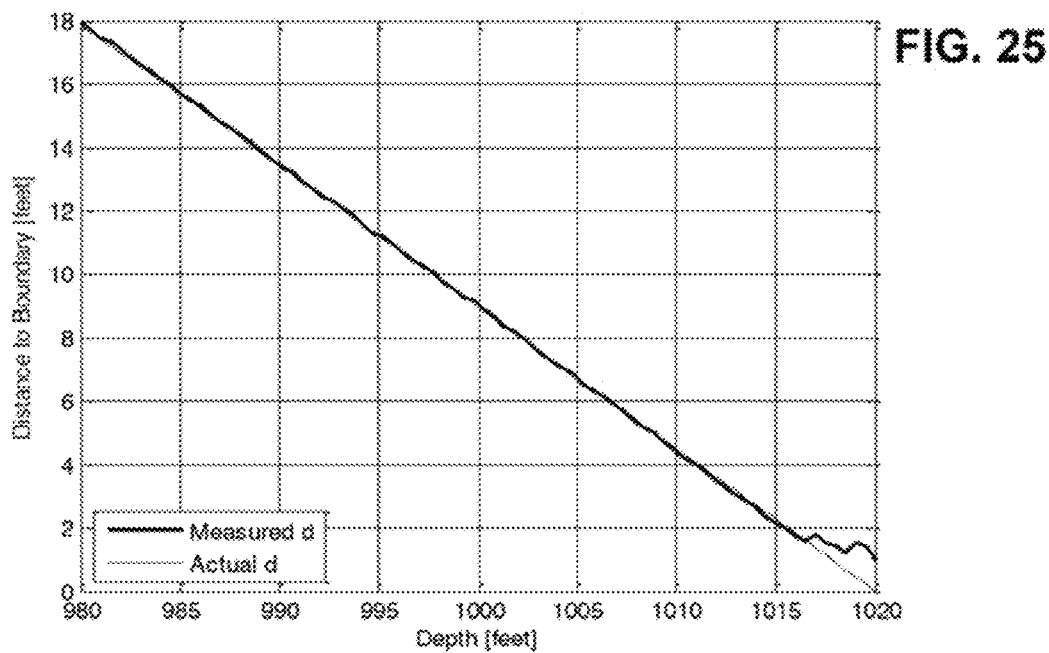

FIG. 23 shows the voltage image $V_{yy}(d,z)$ derived from measurements by a three tilted-antenna tool approaching a well casing at an intersection angle of 26.57° as shown in the inset figure. The formation has a relative permittivity of 10 and a resistivity of 100 Ω-m. The azimuthal direction of the well casing from the tool is 0°. A 15 ns pulse with Gaussian shape was used. FIGS. 24 and 25 show the well casing elevation, azimuth, and distance measurements extracted from the voltage image of FIG. 23. It can be seen from the figure that all parameters are measured successfully even at 20' distance.

The foregoing examples demonstrate that a multi-component transceiver antenna with time-domain pulse signaling and processing can provide accurate formation property measurements as well as direction and distance measurements to multiple anomalies. The distance measurement can be performed by inspecting the maxima of the received signal in time. The direction measurement can be performed by taking advantage of electromagnetic polarization effects that are measured by the multi-component antennas. Because the antennas can be collocated and do not need to be directional, various restrictions on electrical and mechanical design of the tool are avoided. Significantly, the approach outlined herein enables the use of tilted coil antennas and eases adaptation to logging-while-drilling applications. The collocated nature of the antennas enables transceiver placement near the bit, thereby increasing look-ahead distances.

Since reflections are naturally decoupled from the direct signal in the time domain, depth of detection is not dependent on the separation between the transmitter and the receiver. This enables detection distances to reach or even exceed 400 feet in resistive formations. Similarly, reflections from anomalies at different distances are also naturally decoupled from each other. As a result, it is expected that multiple anomalies can be detected and tracked without resorting to complex inversion algorithms, thereby enabling real-time analysis. Moreover, the size of the tool can be reduced relative to other electromagnetic logging tools because at least some of the electronics (e.g., the antennas) can be shared between the transmit and receive modules.

Numerous variations and modifications will become apparent to those skilled in the art once the above disclosure is fully appreciated. For example, the foregoing disclosure describes numerous antenna configurations in the context of a logging while drilling tool, such antenna configurations can also be readily applied to wireline logging tools. It is intended that the following claims be interpreted to embrace all such variations and modifications.

What is claimed is:

1. A borehole logging tool that comprises:
at least two antennas to receive reflections of one or more electromagnetic pulses transmitted from the tool; and
a processor that processes receive signals from the at least two antennas as a function of tool position to provide at least one formation image that plots reflected electromagnetic signals or associated values as a function of depth and of distance from a borehole to represent one or more formation anomalies, wherein the formation image is selected from a set consisting of: a reflected self-component electromagnetic signal image; a reflected cross-component electromagnetic signal image; an anomaly azimuth angle image; and an anomaly elevation angle image.

2. The tool of claim 1, wherein the processor processes said receive signals to determine a direction or distance of the one or more anomalies.

3. The tool of claim 2, wherein the one or more anomalies comprise a cased well or a boundary between formation regions having different resistivity.

4. The tool of claim 1, wherein the two antennas are part of an antenna triad, and wherein each antenna in the triad transmits selected ones of said electromagnetic pulses from the tool.

5. The tool of claim 4, wherein the antennas in the antenna triad are substantially collocated.

6. The tool of claim 1, wherein said antennas are of a type in a set consisting of separated electrodes, wires, toroids, and horns.

7. The tool of claim 1, wherein said antennas are of a type in a set consisting of coils, tilted coils, magnetometers, and solenoids.

8. The tool of claim 1, wherein said electromagnetic pulses have widths below 100 ns.

9. The tool of claim 1, wherein the reflected electromagnetic signals comprise a plurality of reflected self-component electromagnetic signals plotted as a function of depth and of distance from a borehole, or a plurality of reflected cross-component electromagnetic signals plotted as a function of depth and of distance from a borehole.

10. The tool of claim 1, wherein the associated values comprise a plurality of anomaly azimuth angle values plotted as a function of depth and of distance from a borehole, or a plurality of anomaly elevation angle values plotted as a function of depth and of distance from a borehole.

11. A borehole logging method that comprises:
transmitting electromagnetic pulses from a tool in a borehole;
measuring, by at least two antennas of the tool, self-component and cross-component responses to the electromagnetic pulses, said responses including one or more reflection signals;
processing, by a processor, said responses as a function of tool position to provide at least one formation image that plots reflected electromagnetic signals or associated values as a function of depth and of distance from a borehole to represent one or more formation anomalies, wherein the formation image is selected, wherein the formation image is selected from a set consisting of: a reflected self-component electromagnetic signal image; a reflected cross-component electromagnetic signal image; an anomaly azimuth angle image; and an anomaly elevation angle image;
determining a formation anomaly direction or distance based on the formation image; and
communicating a representation of said direction or distance to a user.

12. The method of claim 11, wherein said one or more anomalies are in a set consisting of a cased well, a formation bed boundary, and a fluid boundary.

13. The method of claim 11, wherein said tool comprises a triad of differently oriented antennas that each transmit and receive.

14. The method of claim 13, wherein said antennas at least approximate electric dipoles or magnetic dipoles.

15. The method of claim 11, wherein said electromagnetic pulses have widths below 100 ns.

16. The method of claim 11, wherein said responses further include a direct signal.

17. The method of claim 16, further comprising determining a formation resistivity or a relative permittivity of the formation from said direct signal.

18. The method of claim 11, wherein said determining includes finding an eigenvector expansion of an orthogonal dipole signal data tensor.

19. The method of claim 11, wherein the reflected electromagnetic signals comprise a plurality of reflected self-component electromagnetic signals plotted as a function of depth and of distance from a borehole, or a plurality of reflected cross-component electromagnetic signals plotted as a function of depth and of distance from a borehole.

20. The method of claim 11, wherein the associated values comprise a plurality of anomaly azimuth angle values plotted as a function of depth and of distance from a borehole, or a plurality of anomaly elevation angle values plotted as a function of depth and of distance from a borehole.

* * * * *

UNITED STATES PATENT AND TRADEMARK OFFICE
CERTIFICATE OF CORRECTION

| | |
|---|---|
| PATENT NO. | : 9,562,987 B2 |
| APPLICATION NO. | : 14/111963 |
| DATED | : February 7, 2017 |
| INVENTOR(S) | : Baris Guner et al. |

Page 1 of 1

It is certified that error appears in the above-identified patent and that said Letters Patent is hereby corrected as shown below:

In the Specification

Column 10, Line 47, the text "$R_f=1\ \Omega m$" should read as --$R_f=100\ \Omega m$--
Column 11, Lines 19 and 24, the word "convened" should read as --converted--
Column 12, formula (5), the portion of the formula "$\theta_{unmeasured}(z)$" should appear as --$\theta_{measured}(z)$--
Column 13, Line 7, the word "cases" should read as --eases--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*